US012183158B2

(12) United States Patent
Palchetti et al.

(10) Patent No.: US 12,183,158 B2
(45) **Date of Patent: *Dec. 31, 2024**

(54) GAMING SYSTEM AND METHOD FOR RESUMING A SKILL-BASED GAME AFTER AN INTERRUPTION EVENT

(71) Applicant: IGT, Las Vegas, NV (US)

(72) Inventors: Johnny L. Palchetti, Henderson, NV (US); Dwayne R. Nelson, Las Vegas, NV (US); Cameron Filipour, Las Vegas, NV (US); Michael G. Spendlove, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,031

(22) Filed: Jul. 25, 2023

(65) Prior Publication Data

US 2023/0368613 A1 Nov. 16, 2023

Related U.S. Application Data

(63) Continuation of application No. 17/862,808, filed on Jul. 12, 2022, now Pat. No. 11,763,631, which is a (Continued)

(51) Int. Cl.
*G07F 17/32* (2006.01)

(52) U.S. Cl.
CPC ........ *G07F 17/326* (2013.01); *G07F 17/3295* (2013.01)

(58) Field of Classification Search
CPC ........................... G07F 17/326; G07F 17/3295
See application file for complete search history.

(56) References Cited

U.S. PATENT DOCUMENTS 2,205,471 A 6/1940 Fagerholma
2,474,573 A 6/1949 Cohen
(Continued)

FOREIGN PATENT DOCUMENTS

GB 2083936 3/1982
GB 2098778 11/1985
(Continued)

OTHER PUBLICATIONS

Pumaman1, Vote to skip countdown, or a ready button. Forum Archive [online]. Apr. 13, 2010 [retrieved on May 26, 2015]. Retrieved from the Internet <URL: http://forums.na.leagueoflegends.com/board/showthread.php?t=92620>.
(Continued)

*Primary Examiner* — Kevin Y Kim
(74) *Attorney, Agent, or Firm* — Neal, Gerber & Eisenberg LLP

(57) ABSTRACT

A gaming system and method that provides one or more players with one or more pre-resumption opportunities prior to resuming the play of the skill-based game. The gaming system enables one or more players to affirmatively acknowledge, following a game play interruption, that they are ready to resume play of the skill-based game. Such an opportunity to indicate a readiness to resume the play of the skill-based game provides that the play of the skill-based game resumes when the player is ready and minimizes the affect of any game play interruption on the player's outcome of the skill-based game.

11 Claims, 10 Drawing Sheets

Related U.S. Application Data continuation of application No. 16/987,532, filed on Aug. 7, 2020, now Pat. No. 11,443,596, which is a continuation of application No. 16/006,380, filed on Jun. 12, 2018, now abandoned, which is a continuation of application No. 13/937,662, filed on Jul. 9, 2013, now abandoned.

(56) References Cited

U.S. PATENT DOCUMENTS

| | | | |
|---|---|---|---|
| 2,743,108 | A | 4/1956 | Sanders |
| 2,812,182 | A | 11/1957 | Fiorino |
| 2,842,368 | A | 7/1958 | Williamos |
| 3,505,646 | A | 4/1970 | Affel. , Jr. et al. |
| 3,549,150 | A | 12/1970 | Weeks |
| 3,655,199 | A | 4/1972 | Oliki |
| D228,142 | S | 8/1973 | Mannina |
| 3,843,133 | A | 10/1974 | Brown |
| 3,853,324 | A | 12/1974 | Reiner et al. |
| 3,877,700 | A | 4/1975 | Moe |
| 3,923,305 | A | 12/1975 | Reiner et al. |
| 4,012,046 | A | 3/1977 | Liket |
| 4,015,850 | A | 4/1977 | Russell |
| 4,033,588 | A | 7/1977 | Watts |
| 4,066,264 | A | 1/1978 | Rowman |
| 4,093,215 | A | 6/1978 | Ballard |
| 4,126,851 | A | 11/1978 | Okor |
| 4,129,304 | A | 12/1978 | Mager |
| 4,149,727 | A | 4/1979 | Penney |
| 4,193,598 | A | 3/1980 | Freese |
| 4,198,052 | A | 4/1980 | Gauselmann |
| 4,218,063 | A | 8/1980 | Cooper et al. |
| 4,247,106 | A | 1/1981 | Jeffers et al. |
| 4,322,612 | A | 3/1982 | Lange |
| 4,335,809 | A | 6/1982 | Wain |
| 4,339,798 | A | 7/1982 | Hedges et al. |
| 4,359,227 | A | 11/1982 | Porciello |
| 4,363,485 | A | 12/1982 | Edwall |
| 4,372,558 | A | 2/1983 | Shimamoto et al. |
| 4,389,048 | A | 6/1983 | Burgess |
| 4,443,012 | A | 4/1984 | Makovic et al. |
| 4,448,419 | A | 5/1984 | Telnaes |
| 4,467,424 | A | 8/1984 | Hedges et al. |
| 4,494,197 | A | 1/1985 | Troy et al. |
| 4,506,890 | A | 3/1985 | Murry |
| 4,517,656 | A | 5/1985 | Solimeno et al. |
| 4,550,916 | A | 11/1985 | Ortiz |
| 4,564,923 | A | 1/1986 | Nakano |
| 4,570,930 | A | 2/1986 | Matheson |
| 4,572,509 | A | 2/1986 | Sitrick |
| 4,573,681 | A | 3/1986 | Okada |
| 4,582,324 | A | 4/1986 | Koza et al. |
| 4,586,707 | A | 5/1986 | McNeight et al. |
| 4,593,904 | A | 6/1986 | Graves |
| 4,614,342 | A | 9/1986 | Takashima |
| 4,615,527 | A | 10/1986 | Moss |
| 4,618,150 | A | 10/1986 | Kimura |
| 4,624,459 | A | 11/1986 | Kaufman |
| 4,636,174 | A | 1/1987 | Andersen et al. |
| 4,648,602 | A | 3/1987 | Maroncy |
| 4,652,998 | A | 3/1987 | Koza et al. |
| 4,657,256 | A | 4/1987 | Okada |
| 4,666,160 | A | 5/1987 | Hamilton |
| 4,695,053 | A | 9/1987 | Vazquez, Jr. et al. |
| 4,720,108 | A | 1/1988 | Gramera |
| 4,752,068 | A | 6/1988 | Endo |
| 4,756,532 | A | 7/1988 | Kamille |
| 4,760,527 | A | 7/1988 | Sidley |
| 4,773,647 | A | 9/1988 | Okada et al. |
| 4,781,377 | A | 11/1988 | McVean et al. |
| 4,805,907 | A | 2/1989 | Hagiwara |
| 4,834,386 | A | 5/1989 | Rosenthal et al. |
| 4,836,546 | A | 6/1989 | DiRe et al. |
| 4,836,553 | A | 6/1989 | Suttle et al. |
| 4,837,728 | A | 6/1989 | Barrie et al. |
| 4,861,041 | A | 8/1989 | Jones et al. |
| 4,926,327 | A | 5/1990 | Sidley |
| 4,936,588 | A | 6/1990 | Rader et al. |
| 4,948,133 | A | 8/1990 | Helm et al. |
| 4,961,581 | A | 10/1990 | Barnes et al. |
| 4,964,642 | A | 10/1990 | Kamille |
| 4,986,546 | A | 1/1991 | Cerulla |
| 4,995,615 | A | 2/1991 | Cheng |
| 5,001,632 | A | 3/1991 | Hall-Tipping |
| 5,031,914 | A | 7/1991 | Rosenthal |
| 5,043,889 | A | 8/1991 | Luccy |
| 5,083,271 | A | 1/1992 | Thacher et al. |
| 5,083,800 | A | 1/1992 | Lockton |
| 5,102,134 | A | 4/1992 | Smyth |
| 5,112,050 | A | 5/1992 | Koza et al. |
| 5,114,155 | A | 5/1992 | Tillery et al. |
| 5,116,055 | A | 5/1992 | Tracy |
| 5,129,652 | A | 7/1992 | Wilkinson |
| 5,193,815 | A | 3/1993 | Pollard |
| 5,205,555 | A | 4/1993 | Humano |
| 5,221,083 | A | 6/1993 | Dote |
| 5,280,909 | A | 1/1994 | Tracy |
| 5,286,036 | A | 2/1994 | Barabash |
| 5,290,033 | A | 3/1994 | Bittner et al. |
| 5,299,810 | A | 4/1994 | Pierce et al. |
| 5,301,952 | A | 4/1994 | Fitzgerald |
| 5,308,065 | A | 5/1994 | Bridgeman et al. |
| 5,324,041 | A | 6/1994 | Boylan et al. |
| 5,340,317 | A | 8/1994 | Freeman |
| 5,342,047 | A | 8/1994 | Heidel et al. |
| 5,342,049 | A | 8/1994 | Wichinsky et al. |
| 5,342,058 | A | 8/1994 | Giovannetti |
| 5,344,144 | A | 9/1994 | Cannon |
| 5,356,140 | A | 10/1994 | Dabrowski et al. |
| 5,374,060 | A | 12/1994 | Goldberg |
| 5,380,008 | A | 1/1995 | Mathis et al. |
| 5,393,061 | A | 2/1995 | Manship et al. |
| 5,393,067 | A | 2/1995 | Paulsen et al. |
| 5,397,125 | A | 3/1995 | Adams |
| 5,401,024 | A | 3/1995 | Simunek |
| 5,409,225 | A | 4/1995 | Kelly et al. |
| 5,411,260 | A | 5/1995 | Smith |
| 5,411,268 | A | 5/1995 | Nelson et al. |
| 5,411,271 | A | 5/1995 | Mirando |
| 5,417,424 | A | 5/1995 | Snowden et al. |
| 5,429,361 | A | 7/1995 | Raven et al. |
| 5,449,173 | A | 9/1995 | Thomas et al. |
| 5,462,277 | A | 10/1995 | Takemoto |
| 5,472,195 | A | 12/1995 | Takemoto et al. |
| 5,482,289 | A | 1/1996 | Weingardt |
| 5,489,096 | A | 2/1996 | Aton |
| 5,531,440 | A | 7/1996 | Babrowski et al. |
| 5,536,016 | A | 7/1996 | Thompson |
| 5,542,669 | A | 8/1996 | Charron et al. |
| 5,544,892 | A | 8/1996 | Breeding |
| 5,560,603 | A | 10/1996 | Seelig et al. |
| 5,560,610 | A | 10/1996 | Behm et al. |
| 5,564,700 | A | 10/1996 | Celona |
| 5,564,977 | A | 10/1996 | Algie |
| 5,593,349 | A | 1/1997 | Miguel et al. |
| 5,611,535 | A | 3/1997 | Tiberio |
| 5,611,730 | A | 3/1997 | Weiss |
| 5,613,679 | A | 3/1997 | Casa et al. |
| 5,618,045 | A | 4/1997 | Kagan et al. |
| 5,624,119 | A | 4/1997 | Leake |
| 5,628,684 | A | 5/1997 | Bouedec |
| 5,643,088 | A | 7/1997 | Vaughn et al. |
| 5,645,281 | A | 7/1997 | Hesse et al. |
| 5,645,486 | A | 7/1997 | Nagao et al. |
| 5,647,798 | A | 7/1997 | Falciglia |
| 5,649,704 | A | 7/1997 | Dobbin |
| 5,664,998 | A | 9/1997 | Seelig et al. |
| 5,667,217 | A | 9/1997 | Kelly et al. |
| 5,669,817 | A | 9/1997 | Tarantino |
| 5,671,921 | A | 9/1997 | Seelig et al. |
| 5,676,371 | A | 10/1997 | Kelly et al. |
| 5,697,611 | A | 12/1997 | Kelly et al. |
| 5,697,843 | A | 12/1997 | Manship et al. |
| 5,700,007 | A | 12/1997 | Kelly et al. |

(56) References Cited

U.S. PATENT DOCUMENTS 5,700,008 A 12/1997 Lawlor et al.
5,704,612 A 1/1998 Kelly et al.
5,707,285 A 1/1998 Place et al.
5,707,286 A 1/1998 Carlson
5,718,429 A 2/1998 Keller, Jr.
5,722,891 A 3/1998 Inoue
5,727,786 A 3/1998 Weingardt
5,732,948 A 3/1998 Yoseloff
5,733,193 A 3/1998 Allard et al.
5,743,523 A 4/1998 Kelly et al.
5,743,532 A 4/1998 Lafferty
5,755,621 A 5/1998 Marks et al.
5,766,074 A 6/1998 Cannon et al.
5,768,382 A 6/1998 Schneier et al.
5,769,424 A 6/1998 Kelly et al.
5,769,716 A 6/1998 Saffari et al.
5,772,509 A 6/1998 Weiss
5,772,510 A 6/1998 Roberts
5,779,544 A 7/1998 Seelig et al.
5,779,549 A 7/1998 Walker et al.
5,788,240 A 8/1998 Feinberg
5,788,573 A 8/1998 Baerlocher et al.
5,803,451 A 9/1998 Kelly et al.
5,803,914 A 9/1998 Ryals et al.
5,810,354 A 9/1998 Banyai
5,816,915 A 10/1998 Kadlic
5,816,918 A 10/1998 Kelly et al.
5,823,874 A 10/1998 Adaras
5,823,875 A 10/1998 Tarantino
5,833,536 A 11/1998 Davids et al.
5,833,537 A 11/1998 Barrie
5,833,538 A 11/1998 Weiss
5,836,586 A 11/1998 Marks et al.
5,836,819 A 11/1998 Ugawa
5,839,960 A 11/1998 Parra et al.
5,848,932 A 12/1998 Adaros
5,851,148 A 12/1998 Brune et al.
5,855,514 A 1/1999 Kamille
5,860,648 A 1/1999 Petermeier et al.
5,868,618 A 2/1999 Netley et al.
5,871,398 A 2/1999 Schneier et al.
5,873,781 A 2/1999 Keane
5,876,284 A 3/1999 Actes et al.
5,882,258 A 3/1999 Kelly et al.
5,882,261 A 3/1999 Adams
5,885,157 A 3/1999 Harada et al.
5,888,115 A 3/1999 Shoemaker, Jr. et al.
5,890,963 A 4/1999 Yen
5,902,184 A 5/1999 Bennett et al.
5,909,875 A 6/1999 Weingardt
5,910,046 A 6/1999 Wada et al.
5,911,418 A 6/1999 Adams
5,919,088 A 7/1999 Weiss
5,938,196 A 8/1999 Antoja
5,941,770 A 8/1999 Miers et al.
5,951,397 A 9/1999 Dickinson
5,964,463 A 10/1999 Moore, Jr.
5,967,514 A 10/1999 Kelly et al.
5,980,384 A 11/1999 Barric
5,984,779 A 11/1999 Bridgeman et al.
5,988,638 A 11/1999 Rodesch et al.
5,988,643 A 11/1999 Awada
5,993,315 A 11/1999 Strider et al.
5,997,401 A 12/1999 Crawford
6,004,207 A 12/1999 Wilson, Jr. et al.
6,007,426 A 12/1999 Kelly et al.
6,012,722 A 1/2000 Petermeier et al.
6,012,982 A 1/2000 Piechowiak et al.
6,015,344 A 1/2000 Kelly et al.
6,015,346 A 1/2000 Bennett
6,019,369 A 2/2000 Nakagawa et al.
6,019,374 A 2/2000 Breeding
6,024,641 A 2/2000 Sarno
6,033,307 A 3/2000 Vancura
6,047,963 A 4/2000 Pierce et al.
6,048,271 A 4/2000 Barcelou
6,050,895 A 4/2000 Luciano, Jr. et al.
6,056,642 A 5/2000 Bennett
6,062,979 A 5/2000 Inoue
6,062,981 A 5/2000 Luciano, Jr. et al.
6,068,552 A 5/2000 Walker et al.
6,071,192 A 6/2000 Weiss
6,089,976 A 7/2000 Schneider et al.
6,089,977 A 7/2000 Bennett
6,089,978 A 7/2000 Adams
6,089,980 A 7/2000 Gauselmann
6,102,400 A 8/2000 Scott et al.
6,102,402 A 8/2000 Scott et al.
6,102,798 A 8/2000 Bennett
6,110,039 A 8/2000 Oh
6,110,041 A 8/2000 Walker et al.
6,110,043 A 8/2000 Olsen
6,113,492 A 9/2000 Walker et al.
6,117,007 A 9/2000 Matsuyama et al.
6,117,008 A 9/2000 Machiguchi
6,120,031 A 9/2000 Adams
6,120,377 A 9/2000 McGinnis, Sr. et al.
6,120,378 A 9/2000 Moody et al.
6,123,333 A 9/2000 McGinnis, Sr. et al.
6,126,541 A 10/2000 Fuchs
6,126,542 A 10/2000 Fier
6,126,547 A 10/2000 Ishimoto
6,135,453 A 10/2000 Srichayaporn
6,135,884 A 10/2000 Hedrick et al.
6,135,885 A 10/2000 Lermusiaux
6,139,013 A 10/2000 Pierce et al.
6,142,873 A 11/2000 Weiss et al.
6,142,874 A 11/2000 Kodachi et al.
6,146,273 A 11/2000 Olsen
6,149,156 A 11/2000 Feola
6,159,095 A 12/2000 Frohin et al.
6,159,097 A 12/2000 Gura
6,159,098 A 12/2000 Slomiany et al.
6,165,070 A 12/2000 Nolte et al.
6,173,955 B1 1/2001 Perrie et al.
6,174,235 B1 1/2001 Walker et al.
6,174,237 B1 1/2001 Stephenson
6,176,781 B1 1/2001 Walker et al.
6,183,361 B1 2/2001 Cummings et al.
6,190,255 B1 2/2001 Thomas et al.
6,193,606 B1 2/2001 Walker et al.
6,210,275 B1 4/2001 Olsen
6,210,279 B1 4/2001 Dickinson
6,213,876 B1 4/2001 Moore, Jr.
6,217,448 B1 4/2001 Olsen
6,220,593 B1 4/2001 Pierce et al.
6,220,961 B1 4/2001 Keane et al.
6,224,482 B1 5/2001 Bennett
6,224,483 B1 5/2001 Mayeroff
6,224,484 B1 5/2001 Okuda et al.
6,224,486 B1 5/2001 Walker et al.
6,227,971 B1 5/2001 Weiss
6,231,442 B1 5/2001 Mayeroff
6,231,445 B1 5/2001 Acres
6,234,897 B1 5/2001 Frohm et al.
6,238,288 B1 5/2001 Walker et al.
6,251,013 B1 6/2001 Bennett
6,261,177 B1 7/2001 Bennett
6,267,669 B1 7/2001 Luciano et al.
6,270,409 B1 8/2001 Shuster
6,270,411 B1 8/2001 Gura et al.
6,279,910 B1 8/2001 De Keller
6,286,834 B1 9/2001 Caputo
6,287,194 B1 9/2001 Okada et al.
6,290,600 B1 9/2001 Glasson
6,290,603 B1 9/2001 Luciano, Jr.
6,293,866 B1 9/2001 Walker et al.
6,302,790 B1 10/2001 Brossard
6,305,686 B1 10/2001 Perrie et al.
6,309,298 B1 10/2001 Gerou
6,309,299 B1 10/2001 Weiss
6,309,300 B1 10/2001 Glavich
6,311,976 B1 11/2001 Yoseloff et al.
6,312,334 B1 11/2001 Yoseloff

(56) References Cited

U.S. PATENT DOCUMENTS

| | | | |
|---|---|---|---|
| 6,315,291 | B1 | 11/2001 | Moody |
| 6,315,660 | B1 | 11/2001 | Demar et al. |
| 6,322,309 | B1 | 11/2001 | Thomas et al. |
| 6,328,649 | B1 | 12/2001 | Randall et al. |
| 6,334,814 | B1 | 1/2002 | Adams |
| 6,346,043 | B1 | 2/2002 | Colin et al. |
| 6,347,996 | B1 | 2/2002 | Gilmore et al. |
| 6,364,313 | B1 | 4/2002 | Moody |
| 6,364,765 | B1 | 4/2002 | Walker et al. |
| 6,364,766 | B1 | 4/2002 | Anderson et al. |
| 6,364,768 | B1 | 4/2002 | Acres et al. |
| 6,368,212 | B1 | 4/2002 | Moody |
| 6,368,214 | B1 | 4/2002 | Luciano |
| 6,375,187 | B1 | 4/2002 | Bacilocher |
| 6,379,245 | B2 | 4/2002 | De Keller |
| 6,386,974 | B1 | 5/2002 | Adams |
| 6,390,473 | B1 | 5/2002 | Vancura et al. |
| 6,394,899 | B1 | 5/2002 | Walker |
| 6,398,218 | B1 | 6/2002 | Vancura |
| 6,398,219 | B1 | 6/2002 | Pierce et al. |
| 6,406,369 | B1 | 6/2002 | Baerlocher et al. |
| 6,413,160 | B1 | 7/2002 | Vancura |
| 6,413,161 | B1 | 7/2002 | Baerlocher et al. |
| 6,419,577 | B1 | 7/2002 | Okada et al. |
| 6,428,412 | B1 | 8/2002 | Anderson et al. |
| 6,435,511 | B1 | 8/2002 | Vancura et al. |
| 6,443,837 | B1 | 9/2002 | Jaffe et al. |
| 6,454,651 | B1 | 9/2002 | Yoseloff |
| 6,461,241 | B1 | 10/2002 | Webb et al. |
| 6,467,771 | B1 | 10/2002 | deKeller |
| 6,471,208 | B2 | 10/2002 | Yoseloff et al. |
| 6,488,580 | B1 | 12/2002 | Robb |
| 6,497,408 | B1 | 12/2002 | Walker et al. |
| 6,506,118 | B1 | 1/2003 | Baerlocher et al. |
| 6,522,312 | B2 | 2/2003 | Ohshima et al. |
| 6,537,150 | B1 | 3/2003 | Luciano et al. |
| 6,554,703 | B1 | 4/2003 | Bussick et al. |
| 6,554,704 | B2 | 4/2003 | Nicastro et al. |
| 6,565,434 | B1 | 5/2003 | Acres |
| 6,569,015 | B1 | 5/2003 | Baerlocher et al. |
| 6,572,473 | B1 | 6/2003 | Baerlocher |
| 6,582,306 | B1 | 6/2003 | Kaminkow |
| 6,585,588 | B2 | 7/2003 | Hart |
| 6,592,457 | B1 | 7/2003 | Frohm et al. |
| 6,599,193 | B2 | 7/2003 | Baerlocher et al. |
| 6,602,137 | B2 | 8/2003 | Kaminkow et al. |
| 6,605,001 | B1 | 8/2003 | Tarantino |
| 6,605,002 | B2 | 8/2003 | Baerlocher |
| 6,607,437 | B2 | 8/2003 | Casey |
| 6,607,438 | B2 | 8/2003 | Baerlocher et al. |
| 6,612,575 | B1 | 9/2003 | Cole et al. |
| 6,626,758 | B1 | 9/2003 | Parham et al. |
| 6,632,140 | B2 | 10/2003 | Berman et al. |
| 6,632,141 | B2 | 10/2003 | Webb et al. |
| 6,645,071 | B2 | 11/2003 | Perrie et al. |
| 6,645,074 | B2 | 11/2003 | Thomas et al. |
| 6,645,075 | B1 | 11/2003 | Gatto et al. |
| 6,648,754 | B2 | 11/2003 | Baerlocher et al. |
| 6,656,040 | B1 | 12/2003 | Brosnan et al. |
| 6,666,765 | B2 | 12/2003 | Vancura |
| 6,669,559 | B1 | 12/2003 | Baerlocher et al. |
| 6,676,521 | B1 | 1/2004 | La Mura et al. |
| 6,682,419 | B2 | 1/2004 | Webb et al. |
| 6,682,420 | B2 | 1/2004 | Webb et al. |
| 6,682,561 | B2 | 2/2004 | Anderson et al. |
| 6,692,003 | B2 | 2/2004 | Potter et al. |
| 6,709,331 | B2 | 3/2004 | Berman |
| 6,709,332 | B2 | 3/2004 | Adams |
| 6,722,976 | B2 | 4/2004 | Adams |
| 6,733,386 | B2 | 5/2004 | Cuddy et al. |
| 6,733,389 | B2 | 5/2004 | Webb et al. |
| 6,746,016 | B2 | 6/2004 | Perric et al. |
| 6,752,717 | B2 | 6/2004 | Vancura |
| 6,761,632 | B2 | 7/2004 | Bansemer et al. |
| 6,767,284 | B1 | 7/2004 | Koza |
| 6,769,983 | B2 | 8/2004 | Slomiany |
| 6,769,986 | B2 | 8/2004 | Vancura |
| 6,780,103 | B2 | 8/2004 | Bansemer et al. |
| 6,780,111 | B2 | 8/2004 | Cannon et al. |
| 6,786,824 | B2 | 9/2004 | Cannon |
| 6,800,027 | B2 | 10/2004 | Giobbi et al. |
| 6,811,482 | B2 | 11/2004 | Letovsky |
| 6,811,486 | B1 | 11/2004 | Luciano, Jr. |
| 6,817,948 | B2 | 11/2004 | Pascal et al. |
| 6,832,959 | B2 | 12/2004 | Baerlocher |
| 6,837,793 | B2 | 1/2005 | McClintic |
| 6,851,674 | B2 | 2/2005 | Pierce et al. |
| 6,852,027 | B2 | 2/2005 | Kaminkow et al. |
| 6,863,606 | B1 | 3/2005 | Berg et al. |
| 6,896,261 | B2 | 5/2005 | Pierce et al. |
| 6,923,720 | B2 | 8/2005 | Loose |
| 6,942,568 | B2 | 9/2005 | Baerlocher |
| RE38,812 | E | 10/2005 | Acres et al. |
| 6,981,917 | B2 | 1/2006 | Webb et al. |
| 6,984,174 | B2 | 1/2006 | Cannon et al. |
| 6,988,732 | B2 | 1/2006 | Vancura |
| 7,052,011 | B2 | 5/2006 | Pierce et al. |
| 7,073,793 | B2 | 7/2006 | Vancura |
| 7,077,744 | B2 | 7/2006 | Cannon |
| 7,156,735 | B2 | 1/2007 | Brosnan et al. |
| 7,169,041 | B2 | 1/2007 | Tessmer et al. |
| 7,169,046 | B2 | 1/2007 | Webb et al. |
| 7,175,521 | B2 | 2/2007 | McClintic |
| 7,182,690 | B2 | 2/2007 | Giobbi et al. |
| 7,192,344 | B2 | 3/2007 | Baerlocher |
| 7,217,187 | B2 | 5/2007 | Vancura |
| 7,234,700 | B2 | 6/2007 | Vancura |
| 7,247,096 | B2 | 7/2007 | Vancura |
| 7,277,947 | B1 | 10/2007 | Van De Sluis |
| 7,284,756 | B2 | 10/2007 | Pierce et al. |
| 7,326,115 | B2 | 2/2008 | Baerlocher |
| 7,357,714 | B2 | 4/2008 | Tessmer et al. |
| 7,572,182 | B2 | 8/2009 | Vancura |
| 7,597,618 | B2 | 10/2009 | Webb et al. |
| 7,857,696 | B2 | 12/2010 | Tarantino |
| 8,398,475 | B2 | 3/2013 | De Waal |
| 2001/0040343 | A1 | 11/2001 | Palciglia, Sr. |
| 2002/0025845 | A1 | 2/2002 | Cannon |
| 2002/0039923 | A1 | 4/2002 | Cannon et al. |
| 2002/0049084 | A1 | 4/2002 | Hugh-Baird et al. |
| 2002/0059252 | A1 | 5/2002 | Yamaguchi |
| 2002/0077173 | A1 | 6/2002 | Luciano et al. |
| 2002/0103029 | A1 | 8/2002 | Finlayson et al. |
| 2002/0107065 | A1 | 8/2002 | Rowe |
| 2002/0128055 | A1 | 9/2002 | Adams |
| 2002/0151342 | A1 | 10/2002 | Tracy et al. |
| 2002/0160825 | A1 | 10/2002 | Nicastro et al. |
| 2002/0193099 | A1 | 12/2002 | Paulsen |
| 2003/0013519 | A1 | 1/2003 | Bennett |
| 2003/0064773 | A1 | 4/2003 | Bacrlocher et al. |
| 2003/0100361 | A1 | 5/2003 | Sharpless et al. |
| 2003/0104854 | A1 | 6/2003 | Cannon |
| 2003/0104860 | A1 | 6/2003 | Cannon et al. |
| 2003/0114209 | A1 | 6/2003 | Ritner, Jr. et al. |
| 2003/0114218 | A1 | 6/2003 | McClintic |
| 2003/0114219 | A1 | 6/2003 | McClintic |
| 2003/0114220 | A1 | 6/2003 | McClintic |
| 2003/0119576 | A1 | 6/2003 | McClintic et al. |
| 2003/0119581 | A1 | 6/2003 | Cannon et al. |
| 2003/0125102 | A1 | 7/2003 | Cannon |
| 2003/0125107 | A1 | 7/2003 | Cannon |
| 2003/0171144 | A1 | 9/2003 | Letovsky |
| 2003/0199306 | A1 | 10/2003 | Parker |
| 2003/0211881 | A1 | 11/2003 | Walker et al. |
| 2003/0216168 | A1 | 11/2003 | Cannon et al. |
| 2004/0048659 | A1 | 3/2004 | Seelig et al. |
| 2004/0106446 | A1 | 6/2004 | Cannon et al. |
| 2004/0116173 | A1 | 6/2004 | Baerlocher |
| 2004/0116174 | A1 | 6/2004 | Baerlocher et al. |
| 2004/0171415 | A1 | 9/2004 | Webb et al. |
| 2004/0176157 | A1 | 9/2004 | Walker et al. |
| 2004/0198490 | A1 | 10/2004 | Bansemer et al. |
| 2004/0204226 | A1 | 10/2004 | Foster et al. |
| 2005/0020340 | A1 | 1/2005 | Cannon |

(56) References Cited

U.S. PATENT DOCUMENTS

| | | | |
|---|---|---|---|
| 2005/0026664 | A1 | 2/2005 | Bansemer et al. |
| 2005/0181853 | A1 | 8/2005 | Baerlocher |
| 2006/0040735 | A1 | 2/2006 | Baerlocher |
| 2006/0063583 | A1 | 3/2006 | Thomas |
| 2006/0105836 | A1 | 5/2006 | Walker et al. |
| 2006/0189382 | A1 | 8/2006 | Muir et al. |
| 2006/0211475 | A1 | 9/2006 | Walker et al. |
| 2006/0211478 | A1 | 9/2006 | Walker et al. |
| 2006/0247012 | A1 | 11/2006 | Walker et al. |
| 2007/0099688 | A1 | 5/2007 | Brosnan et al. |
| 2007/0218997 | A1 | 9/2007 | Cho |
| 2008/0108406 | A1 | 5/2008 | Oberberger |
| 2008/0108425 | A1 | 5/2008 | Oberberger |
| 2008/0119283 | A1 | 5/2008 | Baerlocher |
| 2008/0171593 | A1 | 7/2008 | Haga et al. |
| 2008/0220874 | A1 | 9/2008 | Tatsumi et al. |
| 2008/0311980 | A1 | 12/2008 | Cannon |
| 2009/0029758 | A1 | 1/2009 | Young |
| 2009/0061991 | A1 | 3/2009 | Popovich et al. |
| 2009/0061997 | A1 | 3/2009 | Popovich et al. |
| 2009/0061998 | A1 | 3/2009 | Popovich et al. |
| 2009/0061999 | A1 | 3/2009 | Popovich et al. |
| 2009/0104968 | A1 | 4/2009 | Englman et al. |
| 2010/0137047 | A1 | 6/2010 | Englman et al. |
| 2010/0227691 | A1 | 9/2010 | Karsten |
| 2010/0234089 | A1 | 9/2010 | Saffari et al. |
| 2010/0234091 | A1 | 9/2010 | Baerlocher et al. |
| 2011/0053676 | A1 | 3/2011 | Wolf et al. |
| 2011/0118011 | A1 | 5/2011 | Filipour et al. |
| 2012/0270644 | A1 | 10/2012 | Buht |
| 2013/0273998 | A1 | 10/2013 | Froy, Jr. |
| 2013/0310159 | A1 | 11/2013 | Froy et al. |

FOREIGN PATENT DOCUMENTS

| | | |
|---|---|---|
| GB | 2190227 | 11/1987 |
| GB | 2205188 | 11/1988 |
| GB | 2253299 | 9/1992 |
| JP | 07-275507 | 10/1995 |
| JP | 2000-024320 | 1/2000 |
| JP | 2001-000749 | 1/2001 |
| WO | WO/98/51384 | 11/1998 |
| WO | WO/2001/003786 | 1/2001 |
| WO | WO/2003/027970 | 4/2003 |

OTHER PUBLICATIONS

"League of Legends is a skill-based gambling game, and should be treated as such; how mindset raises ELO," Dec. 28, 2011, reddit, https://www.reddit.com/r/summonerschool/comments/1vrw9i/league_of_legends_is_a_skillbased_gambling_game/ (Year: 2011).

P. Mackey, "The Summoner's Guidebook: Breaking down the skills to win in League of Legends," Sep. 6, 2012, Engadget, https ://www .engadget.com/2012-09-06-the-summoners-guidebook-breaking-down-the-skills-to-win-in-lea .html (Year: 2012).

GAMING SYSTEM AND METHOD FOR RESUMING A SKILL-BASED GAME AFTER AN INTERRUPTION EVENT

PRIORITY CLAIM

This application is a continuation of, claims the benefit of and priority to U.S. patent application Ser. No. 17/862,808, filed on Jul. 12, 2022, which is a continuation of, claims the benefit of and priority to U.S. patent application Ser. No. 16/987,532, filed on Aug. 7, 2020, which is a continuation of, claims the benefit of and priority to U.S. patent application Ser. No. 16/006,380, filed on Jun. 12, 2018, which is a continuation of, claims the benefit of and priority to U.S. patent application Ser. No. 13/937,662, filed on Jul. 9, 2013, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. In certain jurisdictions, such primary games are games of luck, not games of skill. For instance, the gaming machine generally requires the player to place or make a wager to activate the primary or base game. In many of these gaming machines, the award is based on the player obtaining a randomly determined winning symbol or symbol combination and on the amount of the wager (e.g., the higher the wager, the higher the award). Randomly determined symbols or symbol combinations which are less likely to occur usually provide higher awards.

One reason these gaming machines are popular is because an amateur, novice or inexperienced player can play most gaming machines at the player's own pace, with no required skills, strategy or risk evaluation and perform as well as a seasoned or experienced player. As such, because the symbols or symbol combinations are randomly determined (and thus the awards provided to the player are randomly determined), any power failure or other game play interruption will not affect the randomly determined award. That is, any power failure or other game play interruption may delay the timing of when the same randomly determined award is provided to the player, but such a power failure or other game play interruption does not otherwise affect the randomly determined award provided to the player.

Certain other gaming machines include games such as video poker and blackjack which involve certain player strategy or decision-making. In these games, the player decides which cards to hold in draw-type poker games and whether to take additional cards in blackjack-type card games. These games generally require a certain level of strategy to be successful.

Gaming machines in certain jurisdictions involve a skill event such as an event requiring player dexterity to be successful. These games cannot generate outcomes purely upon a random determination. These gaming machines require strategy or timing of inputs by the player to determine chance of success and failure. For example, these games employ skill to determine which award or set of awards will be used to determine the award provided to the player. In these games, because the award is determined based on one or more inputs representing an element of player skill, a power failure may affect such inputs and thus affect the award determined for the play of the skill game. That is, if a power failure occurs and the gaming machine reboots, a delay of up to twenty minutes may occur before the play of the skill-based gaming machine resumes. Based on this extended duration, if game play resumes before the player is ready, the player would not be ready to make any inputs which detrimentally affect the player's award. For example, the gaming machine enables a player to collect items by driving a virtual car through a limited quantity of city streets. In this example, following the occurrence of a power failure, if the gaming machine resumes the play of the game before the player is ready, the player may miss the opportunity to collect lucrative items by moving the virtual car through a beneficial city street. As illustrated in this example, unlike certain non-skill-based games, the ramifications of a power failure (or other game play interruption) may significantly affect the determined awards (and thus the player's gaming experience) of certain skill-based games.

Accordingly, there is a continuing need to provide new and different gaming systems and methods which determine awards for skill-based games after a power failure or other game play interruption.

SUMMARY

In various embodiments, the gaming system and method disclosed herein provides or requires one or more players with one or more resumption opportunities prior to resuming the play of the skill-based game. In these embodiments, rather than resuming the play of a skill-based game as soon as possible following a game play interruption, such as a power failure, the gaming system of the present disclosure enables one or more players to affirmatively acknowledge, following a game play interruption, that they are ready to resume play of the skill-based game. Such an opportunity to indicate a readiness to resume the play of the skill-based game provides that the play of the skill-based game resumes when the player is ready and minimizes the affect of any game play interruption on the player's outcome of the skill-based game. That is, by accounting for the affects that power failures (or other game play interruptions) have on a play of a skill-based game and by maintaining that the award of the skill-based game is determined based on one or more inputs representing an element of player skill, the gaming system of the present disclosure mitigates the affects that power failures (or other game play interruptions) have on a play of a skill-based game.

In various embodiments, the gaming system enables a player to play a skill-based game (or a partial skill-based game). In certain embodiments, the gaming system enables a player to play an individual skill-based game (or an individual partial skill-based game). For example, the gaming system enables a player to make one or more skill-based inputs to control the path of an avatar to collect coins (i.e., a determined skill-based game outcome), wherein the greater the quantity of coins collected, the greater the associated award amount. In certain other embodiments, the gaming system enables a player to play a community or group skill-based game (or a community partial-skill based game). For example, the gaming system enables a plurality of players to each make one or more skill-based inputs in a community shooter game wherein a first player's avatar either kills a second player's avatar (i.e., a first determined skill-based game outcome for the first player) or is killed by the second player's avatar (i.e., a second determined skill-based game outcome for the first player). In such skill-based games (or partial skill-based games), the gaming system determines one or more skill-based game outcomes (and any associated awards) for one or more players based on one or more aspects of the player's level of skill (as determined based on or quantified by zero, one or more inputs made by the player which tend to measure one or more aspects of that player's skill).

In various embodiments, in addition to enabling one or more players to play one or more skill-based games, the gaming system stores game state information pertaining to such played skill-based games. In these embodiments, in anticipation of any potential game interruption event, such as a power failure, the gaming system continuously or periodically stores game state data to facilitate that any interrupted game resumes play from an appropriate game play point prior to the interruption. That is, since the outcomes of such skill-based games often hinge on when one or more skill-based inputs are made by a player, the gaming system stores such game state data to recreate the post-interruption play of the skill-based game to correspond to the pre-interruption play of the skill-based game and thus to minimize (or substantially eliminate) the affect of such a game interruption event.

In various embodiments, following any game interruption event and any subsequent provided service and/or rebooting of the gaming system, the gaming system loads the applicable, previously stored game state data pertaining to the state of the skill-based game prior to the game interruption event. Following the reloading of the applicable game state data and prior to resuming the play of the skill-based game, the gaming system provides any players of the interrupted skill-based game with one or more resumption opportunities to resume the play of the skill-based game. In one such embodiment, the resumption opportunity includes displaying a prompt to each of the players of the skill-based game to indicate a readiness to resume the play of the skill-based game. In this embodiment, if each of the players affirmatively indicates that they are ready to resume the play of the skill-based game, the gaming system resumes the play of the skill-based game based on the loaded game state data. In this embodiment, if each of the players do not affirmatively indicate that they are ready to resume the play of the skill-based game, the gaming system displays a clock or meter to such players wherein the gaming system resumes the play of the skill-based game (based on the loaded game state data) when the first occurs between: (i) the clock or meter reaches a designated amount, or (ii) each of the players affirmatively indicates that they are ready to resume the play of the skill-based game. In another such embodiment, the resumption opportunity includes detecting activity and/or a presence of the player and resuming the play of the skill-based game when the designated activity and/or presence is detected. In these embodiments, by enabling each of the players of a skill-based game (or a partial-skill-based game) the opportunity to prepare and be ready for the post-interruption event resumption of a skill-based game (or partial-skill-based game), the gaming system provides that the outcomes (and associated awards) of the skill-based game remains determined based on elements of players skill (and not determined based on a player's preparedness or unpreparedness when the skill-based game resumes).

In one example embodiment, for a play of a skill-based game, the gaming system enables a player to make at least one quantifiable skill input and determines an outcome, the determination being based, at least in part, on the at least one quantifiable skill input. For the play of the skill-based game, the gaming system determines any award associated with the determined outcome, and displays any determined award to the player. The gaming system of this embodiment stores game state data associated with the play of the skill-based game, and if a skill-based game interruption event occurs prior to a conclusion of the play of the skill-based game: loads the stored game state data, and for a designated period of time, enables the player to indicate to resume the play of the skill-based game. If the player indicates to resume the play of the skill-based game within the designated period of time, prior to an expiration of the designated period of time, the gaming system resumes the play of the skill-based game, wherein the skill-based game is resumed based on the loaded game state data. If the player does not indicate to resume the play of the skill-based game within the designated period of time, after the expiration of the designated period of time, the gaming system resumes the play of the skill-based game, wherein the skill-based game is resumed based on the loaded game state data.

Accordingly, the gaming system and method disclosed herein mitigates the affects that power failures (or other game play interruptions) have on a play of a skill-based game by maintaining that the award of the skill-based game is determined based on one or more inputs representing an element of player skill. Such a configuration increases the level of excitement and enjoyment for players of such skill-based games.

Additional features and advantages are described in, and will be apparent from, the following Detailed Description and the figures.

DETAILED DESCRIPTION

Skill-Based Play

In various embodiments, the gaming system and method disclosed herein provides one or more players with one or more resumption opportunities prior to resuming the play of a skill-based (or partial skill-based) game. In these embodiments, rather than resuming the play of a skill-based game as soon as possible following a game play interruption, such as a power failure, the gaming system of the present disclosure enables one or more players to affirmatively acknowledge, following a game play interruption, that they are ready to resume play of the skill-based game. Such an opportunity to indicate a readiness to resume the play of the skill-based game provides that the play of the skill-based game resumes when the player is ready and minimizes the effect of any game play interruption on the player's outcome of the skill-based game. That is, by accounting for the affects that power failures (or other game play interruptions) have on a play of a skill-based game and by maintaining that the award of the skill-based game is determined based on one or more quantifiable skill inputs representing an element of player skill, the gaming system of the present disclosure mitigates the affects that power failures (or other game play interruptions) have on a play of a skill-based game.

While certain of the embodiments described below are directed to a primary or base skill-based game or a primary or base partial skill-based game, it should be appreciated that such embodiments may additionally or alternatively be employed in association with a secondary or bonus skill-based game or a secondary or bonus partial skill-based game. Moreover, while the player's credit balance, the player's wager, and any awards are displayed as an amount of monetary credits or currency in certain of the embodiments described below, one or more of such player's credit balance, such player's wager, and any awards provided to such a player may be for non-monetary credits, promotional credits, and/or player tracking points or credits.

Figure 1:
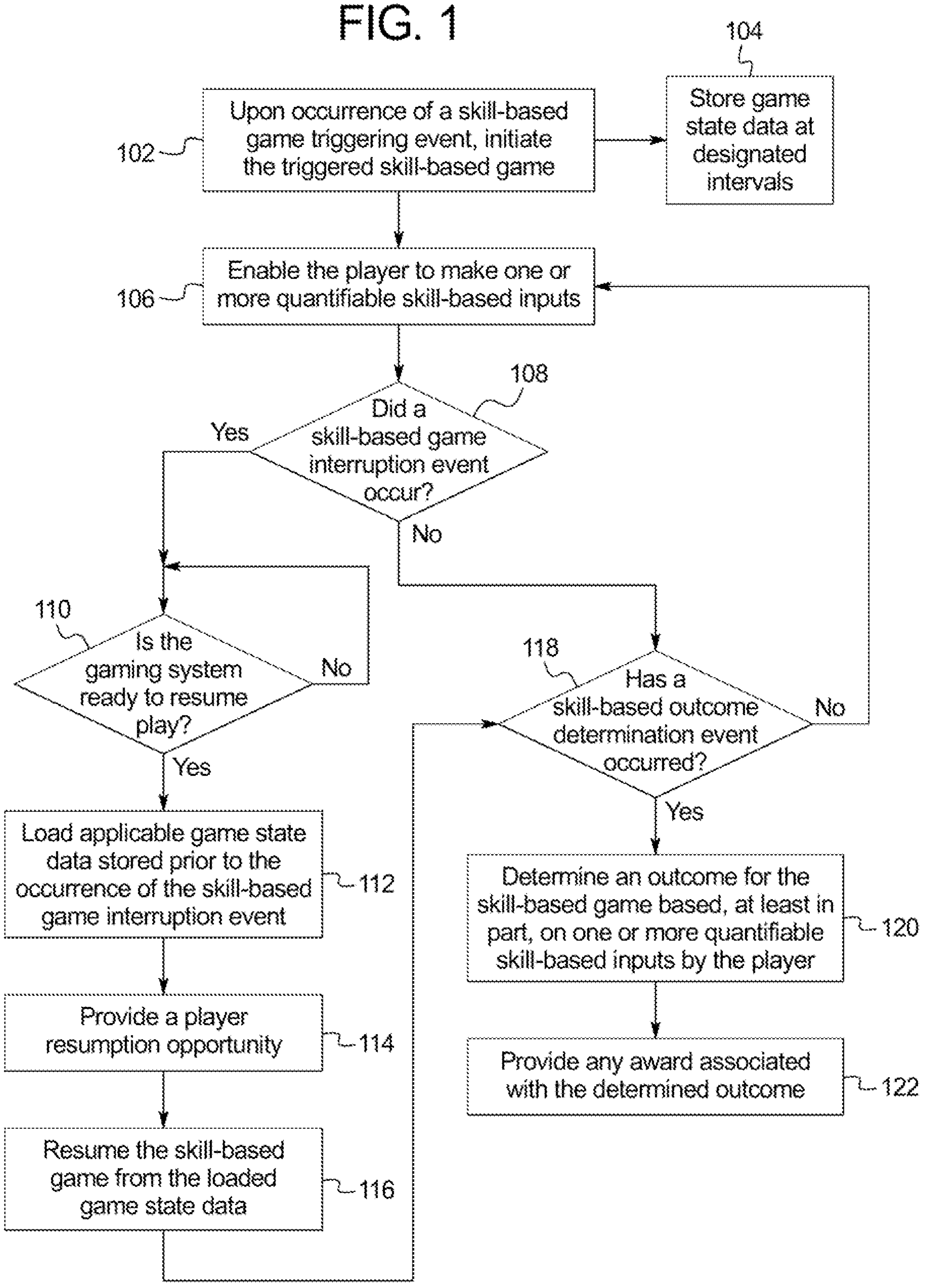
FIG. 1 is a flow chart illustrating an example process of one embodiment for operating a gaming system including a player resumption opportunity for an interrupted skill-based game as disclosed herein.

Referring now to FIG. 1, a flowchart of an example embodiment of a process for operating a gaming system disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In various embodiments, upon an occurrence of a skill-based game triggering event, as indicated by block 102 of FIG. 1, the gaming system initiates or triggers a play of a skill-based game. In one embodiment, a skill-based game (or a partial skill-based game) is a primary game wherein a skill-based game triggering event occurs upon a player placing a wager to play the skill-based game. In another embodiment, a skill-based game (or a partial skill-based game) is a secondary or bonus game wherein a skill-based game triggering event occurs based on a displayed event associated with a wagered on play of a primary game. In another embodiment wherein the skill-based game (or a partial skill-based game) is a secondary or bonus game, a skill-based game triggering event occurs based on an event independent of any displayed event associated with a wagered on play of a primary game.

Figure 2:
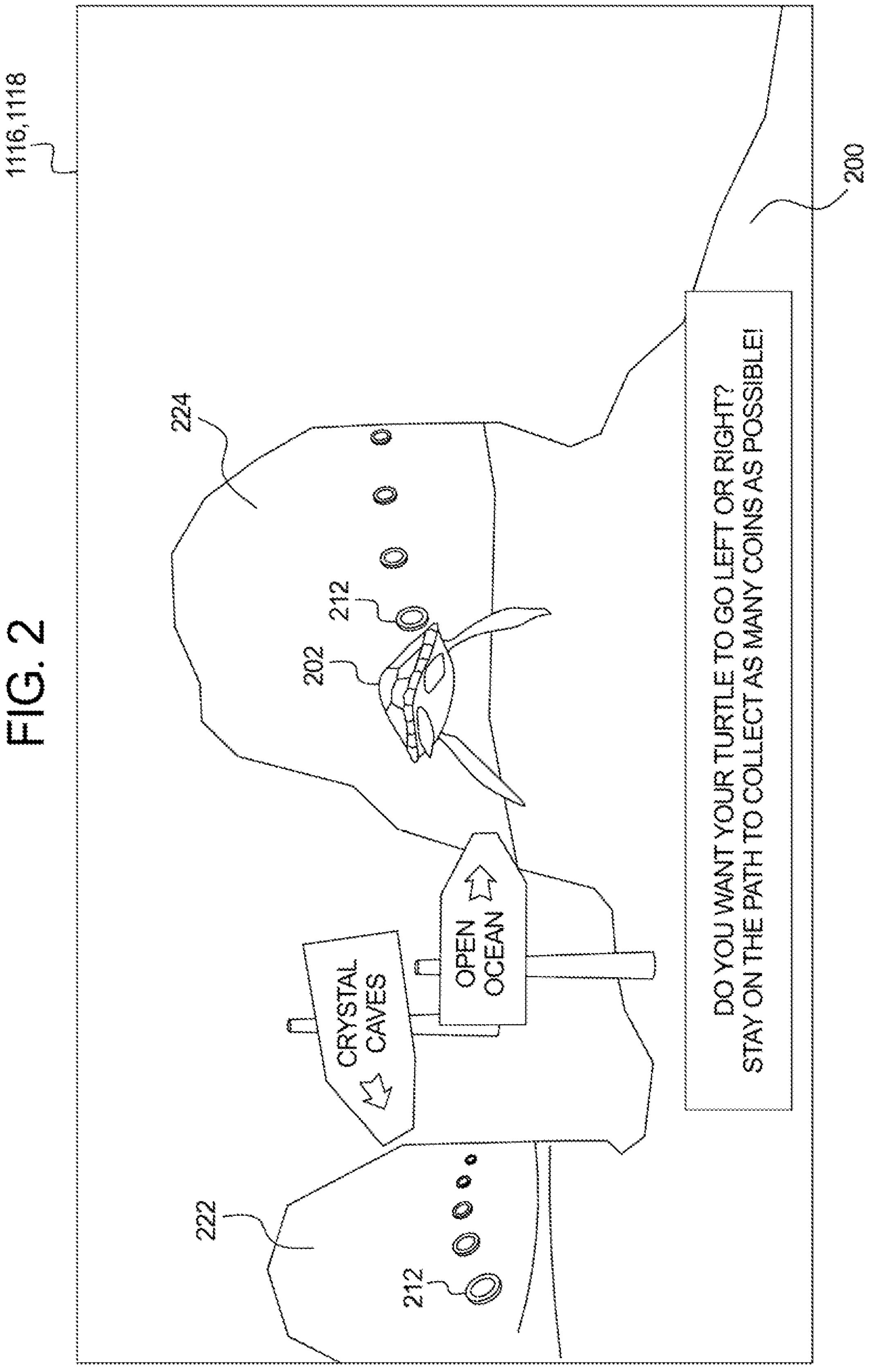
FIG. 2 is an illustrated example of one embodiment of a skill-based game as disclosed herein.

An example of such a skill-based game is illustrated in FIG. 2. For example, as seen in FIG. 2, following an occurrence of a skill-based game triggering event, the gaming system displays a skill-based game including a virtual underwater world 200 (i.e., a game-play environment). In this skill-based game, a player navigates a turtle avatar 202 (by making of one or more quantifiable skill inputs) to collect or accumulate collection units 212, wherein the greater the amount or quantity of collection units collected, the greater the award.

In one embodiment, upon triggering the skill-based game and in anticipation of any potential skill-based game interruption events, such as a potential power failure (or other error state), the gaming system stores game state data pertaining to the play of the triggered skill-based game, as indicated by block 104 of FIG. 1. In one embodiment, the stored game state data is representative of certain elements of the skill-based game. In this embodiment, the gaming system recreates the skill-based game subsequent to any interruptions based on the stored game state data. In various embodiments, the gaming system stores the game state data continuously or substantially continuously. In one embodiment, the gaming system stores game state data on a per graphics frame basis. That is, each display of a new frame of graphics which illustrates the skill-based game being played results in the additional storage of game state data. In various other embodiments, the gaming system stores the game state data periodically. In one such embodiment, at designated intervals, such as every millisecond, the gaming system stores the game state data. In another such embodiment, the gaming system stores the game state data each time a designated object or point (such as a checkpoint) is reached or encountered in association with the play of the skill-based game. For example, referring back to the illustrated example of the skill-based game of FIG. 2, the gaming system stores game state data each time the player successfully collects or accumulates a collection unit 212 with the turtle avatar 202. It should be appreciated that the gaming system may be configured to store the game state data based on any other suitable criteria or at any suitable point in time.

In one embodiment, as indicated by block 106 of FIG. 1, after an initiation of the triggered skill-based game, the gaming system enables a player to make one or more quantifiable skill inputs. A player's skill is determined and quantified by zero, one or more inputs by the player. These determined and quantified inputs tend to measure one or more aspects of the player's skill. It should be appreciated that for purposes of this application, skill includes: (i) physical skill, such as, but not limited to: timing, aim, physical strength or any combination thereof which is quantifiable by zero, one or more inputs made by the player in association with the skill-based game; (ii) mental skill (i.e., knowledge, reasoning, and/or strategy) which is quantifiable by zero, one or more inputs made by the player in association with the skill-based game; and (iii) any other type of skill which is quantifiable by zero, one or more inputs made by the player in association with the skill-based game.

In various embodiments, the player utilizes one or more skill input devices to make one or more quantifiable skill inputs. Examples of skill input devices include, but are not limited to: joysticks, buttons, a mouse or a plurality of mice, one or more trackballs, one or more pointing devices, one or more bodily motion trackers such as motion sensing devices for human-computer interaction, touchpads, touchscreens, one or more controllers with: (1) one or more motion sensing devices, (2) one or more proximity sensing devices, (3) one or more force sensing devices (transducers), (4) one or more accelerometers, or any other suitable skill input devices.

For example, referring back to FIG. 2, the gaming system enables the player to make one or more quantifiable skill inputs to influence (or otherwise control) the path of the turtle avatar 202 in the virtual underwater world 200. In the illustrated example of FIG. 2, the gaming system presents the player with the choice of navigating the turtle avatar down one of two possible paths (i.e., path 222 to the left and path 224 to the right). In this example, the gaming system provides appropriate messages such as DO YOU WANT YOUR TURTLE TO GO LEFT OR RIGHT?" and "STAY ON THE PATH TO COLLECT AS MANY COINS AS POSSIBLE!" to the player visually, or through suitable audio or audiovisual displays. In the illustrative example of FIG. 2, the player makes one or more quantifiable skill inputs to influence (or otherwise control) the turtle avatar 202 to proceed down one of two possible paths. That is, the player's one or more quantifiable skill inputs directly affect the direction in which the turtle avatar 202 proceeds (and thus affects the outcome, the series of outcomes, the event or the sequence of events of the skill-based game). In the illustrated example of FIG. 2, the player's one or more quantifiable skill inputs influence the turtle avatar 202 to proceed down path 224 to the right in the displayed virtual world 200 (and not down path 222 to the left in the displayed virtual world 200).

By making one or more quantifiable skill inputs, the player manipulates, influences or otherwise controls one or more aspects of the skill-based game (and thus influences or otherwise affects the outcome of the skill-based game). In certain embodiments, different quantifiable skill inputs by the player influence a different event or a different sequence of events which occur in association with the play of the skill-based game. That is, a first quantifiable skill input (or type of quantifiable skill input) by the player results in a first outcome, a first series of outcomes, a first event or a first sequence of events, while a second different quantifiable skill input (or type of quantifiable skill input) by the player results in a second outcome, a second series of outcomes, a second event or a second sequence of events. For example, in FIG. 2, if path 224 to the right includes an opportunity to collect a greater number of collection units 212 than path 222 to the left, then the player's one or more quantifiable skill inputs to influence the turtle avatar 202 to proceed down path 224 to the right (and any subsequent quantifiable skill inputs) result in the player having an opportunity (or potential) to collect or accumulate more collection units 212 than if the player made one or more quantifiable skill inputs to influence the turtle avatar 202 to proceed down path 222 to the left.

Referring back now to FIG. 1, in addition to enabling the player to make one or more quantifiable skill inputs, the gaming system determines whether a skill-based game interruption event occurred as indicated by decision diamond 108. In one embodiment, a skill-based game interruption event occurs as a result of a power loss (or any other suitable error state), wherein the power loss (or error state) results in an interruption to (or disruption of) the play of the skill-based game. In other words, a skill-based game interruption event occurs when a loss of power (or other error state) renders a player unable to make (or otherwise prevents a player from making) quantifiable skill inputs to influence one or more outcomes of a skill-based game. Examples of game play interruptions include but are not limited to: a power failure, an error, a malfunction, a tilt, a pause.

In various embodiments, if a skill-based game interruption event occurs, then following the skill-based game interruption event, the gaming system determines whether the interrupted skill-based game is ready to be resumed by any available player, as indicated by decision diamond 110. In one embodiment, upon the occurrence of a skill-based game interruption event, the gaming system enters a reboot cycle, wherein, upon completion of the reboot cycle, a determination is made as to whether the gaming system is ready to resume play of the interrupted skill-based game. In one embodiment, if the gaming system is not ready to resume play of the interrupted skill-based game, the gaming system monitors a status of the gaming system until the gaming system is ready to resume play of the interrupted skill-based game.

On the other hand, if it is determined that the gaming system is ready to resume play of the interrupted skill-based game, the gaming system loads any applicable game state data that was stored prior to the occurrence of the skill-based game interruption event, as indicated by block 112. That is, the gaming system loads any applicable game state data that was continuously, substantially continuously, or periodically stored prior to the skill-based game interruption event (i.e., prior to a power failure or other error state). Such loading of the stored game state provides that the skill-based game is resumed from a point-in-time, and/or location, and/or setting, and/or level, and/or interval which existed prior to the interruption event and thus the resumed game play seamlessly continues.

In various embodiments, as indicated by block 114, after the gaming system loads the game state data that was stored prior to the skill-based game interruption, the gaming system provides a skill-based game resumption opportunity to resume the play of the interrupted skill-based game. In certain embodiments, the resumption opportunity occurs after loading the applicable game state data and prior to resuming play of the interrupted skill-based game. In one such embodiment, the gaming system enables the player to indicate the player's readiness to resume the play of the skill-based game. That is, prior to resuming the skill-based game, the gaming system provides the player an opportunity to indicate the player's readiness to resume the skill-based game.

Figure 3:
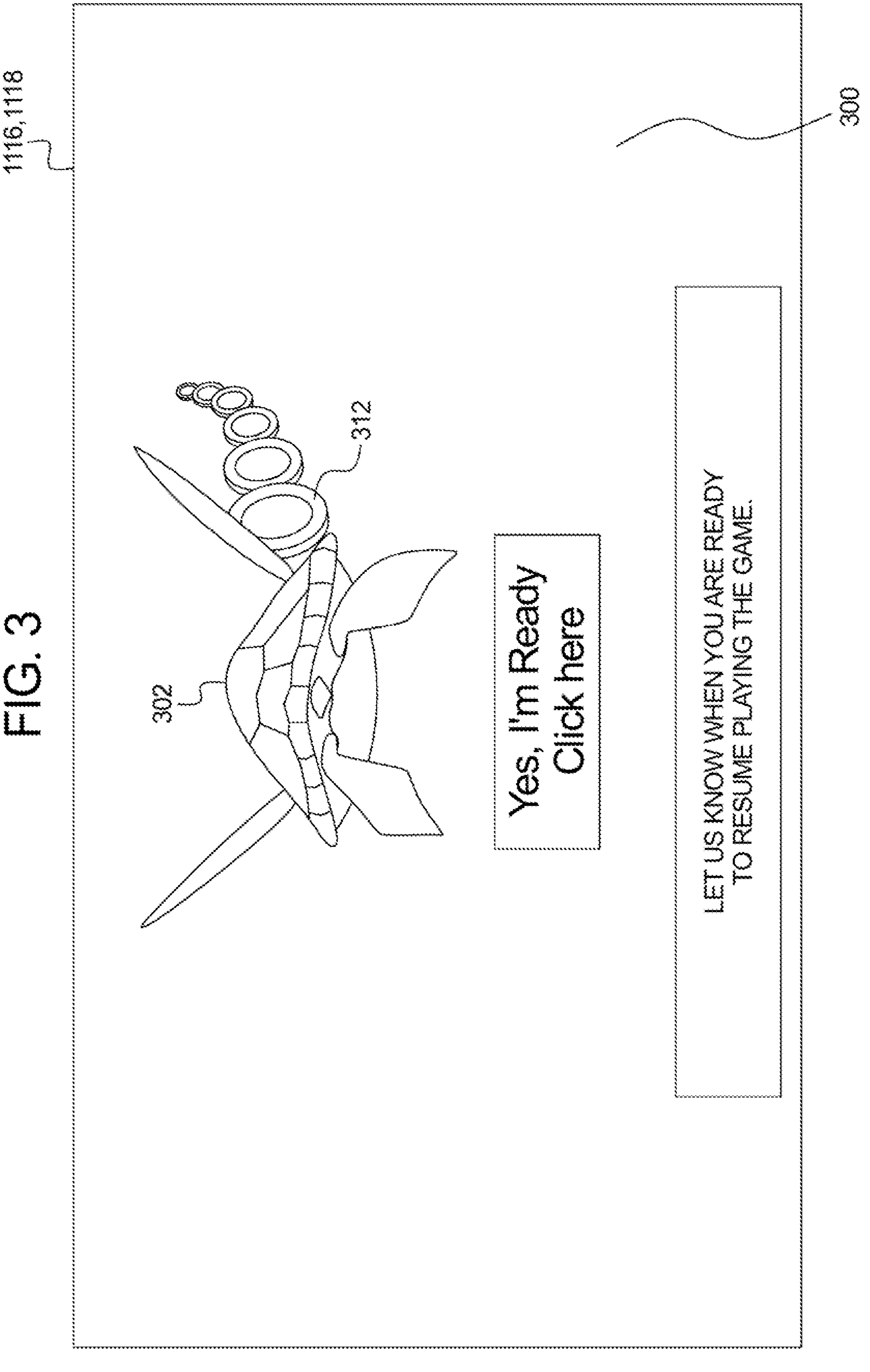
FIG. 3 is an illustrated example of one embodiment of a player resumption opportunity for an interrupted skill-based game as disclosed herein.

In various embodiments, the skill-based game resumption opportunity includes the gaming system displaying a prompt to a player of an interrupted skill-based game requesting the player to indicate the player's readiness to resume play of the interrupted skill-based game. For example, FIG. 3 illustrates a player resumption opportunity for an interrupted skill-based game. The gaming system prompts the player to indicate the player's readiness to resume play of the interrupted skill-based game. In this example, the gaming system provides appropriate messages such as "LET US KNOW WHEN YOU ARE READY TO RESUME PLAYING THE GAME" to the player visually, or through suitable audio or audiovisual displays. In this example, the gaming system additionally provides appropriate messages such as "YES, I'M READY" and "CLICK HERE" to the player visually, or through suitable audio or audiovisual displays. In this example, the player is prompted to indicate whether the player is ready to resume play of the skill-based game by clicking the "CLICK HERE" portion of the message.

In various embodiments, if the player does not affirmatively (actively or passively) indicate a readiness to resume play of the interrupted skill-based game, the gaming system designates a period of time, wherein at the expiration of the designated period of time, the gaming system automatically resumes play of the interrupted skill-based game. That is, although the player is presented with an opportunity to indicate a readiness to resume play of an interrupted skill-based game, in certain embodiments, if the player does not indicate such a readiness within a designated period of time, the gaming system resumes play of the interrupted skill-based game.

In one such embodiment, the gaming system displays a clock or meter to indicate the designated period of time to the player. In one embodiment, once the clock or meter reaches a designated amount (or otherwise reflects an expiration of the designated period of time), the gaming system resumes the play of the interrupted skill-based game. In one embodiment, the resumption of the interrupted skill-based game (as a result of the clock or meter reaching a designated amount) occurs regardless of a readiness of the player to resume the interrupted skill-based game. That is, once the clock or meter reaches the designated amount, the gaming system resumes play of the interrupted skill-based game.

In various other embodiments, the resumption opportunity expires and the gaming system resumes the play of the interrupted skill-based game when the first occurs between: (i) the clock or meter reaches a designated amount, or (ii) the player affirmatively indicates a readiness to resume play of the interrupted skill-based game. In one such embodiment, if the clock or meter indicates an amount different from the designated amount (i.e., there is an amount of time remaining in the resumption opportunity), and the player affirmatively indicates a readiness to resume the play of the interrupted skill-based game, the gaming system resumes the play of the interrupted skill-based game. That is, the gaming system resumes the play of the interrupted skill-based game if the player affirmatively indicates a readiness to resume the play of the interrupted skill-based game regardless of any amount reflected by the clock or meter.

In various embodiments, the player indicates the player's readiness via an input device. In one such embodiment, the player makes an input via a skill input device that the player would otherwise use to influence outcomes of the skill-based game. In another embodiment, the player indicates the player's readiness via an input device different from the skill input device the player would otherwise use to influence outcomes of the skill-based game. It should be appreciated that any suitable method by which the player indicates a readiness to resume play of the interrupted skill-based game is envisioned for the present disclosure. It should also be appreciated that, by detecting a player's presence and/or enabling a player to indicate a readiness to resume the interrupted skill-based game, the gaming system minimizes (or substantially eliminates) the affect any game interruption event may have on the outcome of such a skill-based game. That is, in these embodiments, by providing the players of skill-based games (or partial skill-based games) the opportunity to prepare and be ready for the resumption of such interrupted skill-based games (or partial skill-based games), the gaming system provides that the outcomes (and associated awards) of such interrupted skill-based games (or partial skill-based games) are determined based, at least in part, on elements of player skill (and not determined based on a player's preparedness or unpreparedness to resume such skill-based, or partial skill-based, games).

After providing the player resumption opportunity, the gaming system resumes the interrupted skill-based game based on the loaded game state, as indicated in block 116 of FIG. 1. That is, the gaming system recreates the game-play environment and resumes play of the interrupted skill-based game from a game state (e.g., point-in-time, location, setting, level, interval, etc) that was stored prior to the skill-based game interruption event. In one such embodiment, the gaming system recreates the skill-based game from the loaded game state.

For example, as seen in FIG. 3, the gaming system recreates the virtual underwater world 300, turtle avatar 302 and collection units 312 from the applicable loaded game state data that was stored prior to the skill-based game interruption event. It should be appreciated that the turtle avatar 302 in FIG. 3 (and any additional elements of the virtual underwater world 300) is positioned to resume the play of the skill-based game from a point (or location) along a path which corresponds to the turtle avatar's path prior to the skill-based game interruption. In one embodiment, this position or location along the path is a position that is different from a beginning position along the path and different from an ending position along the path. In another embodiment, this position along the path is a position that corresponds to a beginning (or starting) position. In another embodiment, this position along the path corresponds to an ending position. It should be appreciated that this position along the path from which the gaming system resumes the play of the skill-based game may be any suitable position, location, interval, point, point-in-time or the like.

In one embodiment, after the resumption of the play of the skill-based game, or if a skill-based game interruption event did not occur, the gaming system determines if a skill-based game outcome determination event has occurred, as indicated by decision diamond 118. In one embodiment, a skill-based game outcome determination event occurs based on time. For example, the gaming system determines a designated amount of time for the player to play (or otherwise complete) a skill-based game and a skill-based game outcome determination event occurs when the designated amount of time elapses (or otherwise expires). In another embodiment, the gaming system determines a designated number of quantifiable skill inputs and a skill-based game outcome determination event occurs when a player utilizes the designated number of quantifiable skill inputs. For example, the gaming system determines that a player is enabled to make ten quantifiable skill inputs to navigate a car through a maze of city streets to collect collection units. When the player makes the tenth quantifiable skill input to navigate the car through the maze of city streets, the skill-based game outcome determination event occurs. It should be appreciated that the skill-based game outcome determination event may occur based on any other suitable event, method or criteria.

In one embodiment, if a skill-based game outcome determination event has not occurred, the gaming system returns to block 106 and continues enabling the player to make one or more quantifiable skill inputs. On the other hand, as indicated by block 120, if a skill-based game outcome determination event has occurred in association with the play of the skill-based game, the gaming system determines a skill-based game outcome based, at least in part, on one or more of the quantifiable skill inputs made by the player. After determining the outcome for the skill-based game, the gaming system provides any awards associated with the determined outcome, as indicated by block 122.

In certain embodiments, the gaming system determines one or more outcomes based on one or more quantifiable skill inputs made by the player in association with the play of a skill-based game. For example, in the turtle avatar example discussed above, after a skill-based game outcome determination event occurs, the gaming system determines a number of collection units the player successfully collected, gathered or otherwise accumulated (by making one or more quantifiable skill inputs).

In addition to providing players an opportunity to participate in an individual skill-based game (as discussed above), the gaming system provides one or more players an opportunity to participate in a community or group skill-based game. In one such embodiment, the skill-based game is a cooperative community game wherein a plurality of players cooperate or play together to win one or more awards. In another such embodiment, the skill-based game is a competition community game wherein a plurality of players compete or play against each other to win one or more awards. In these embodiments, the gaming system enables one or more players to indicate a readiness to resume a community or group skill-based game following an interruption event. That is, in certain embodiments, the gaming system enables a plurality of players participating in an interrupted community skill-based game to indicate a readiness to resume the interrupted community skill-based game.

Figure 4:
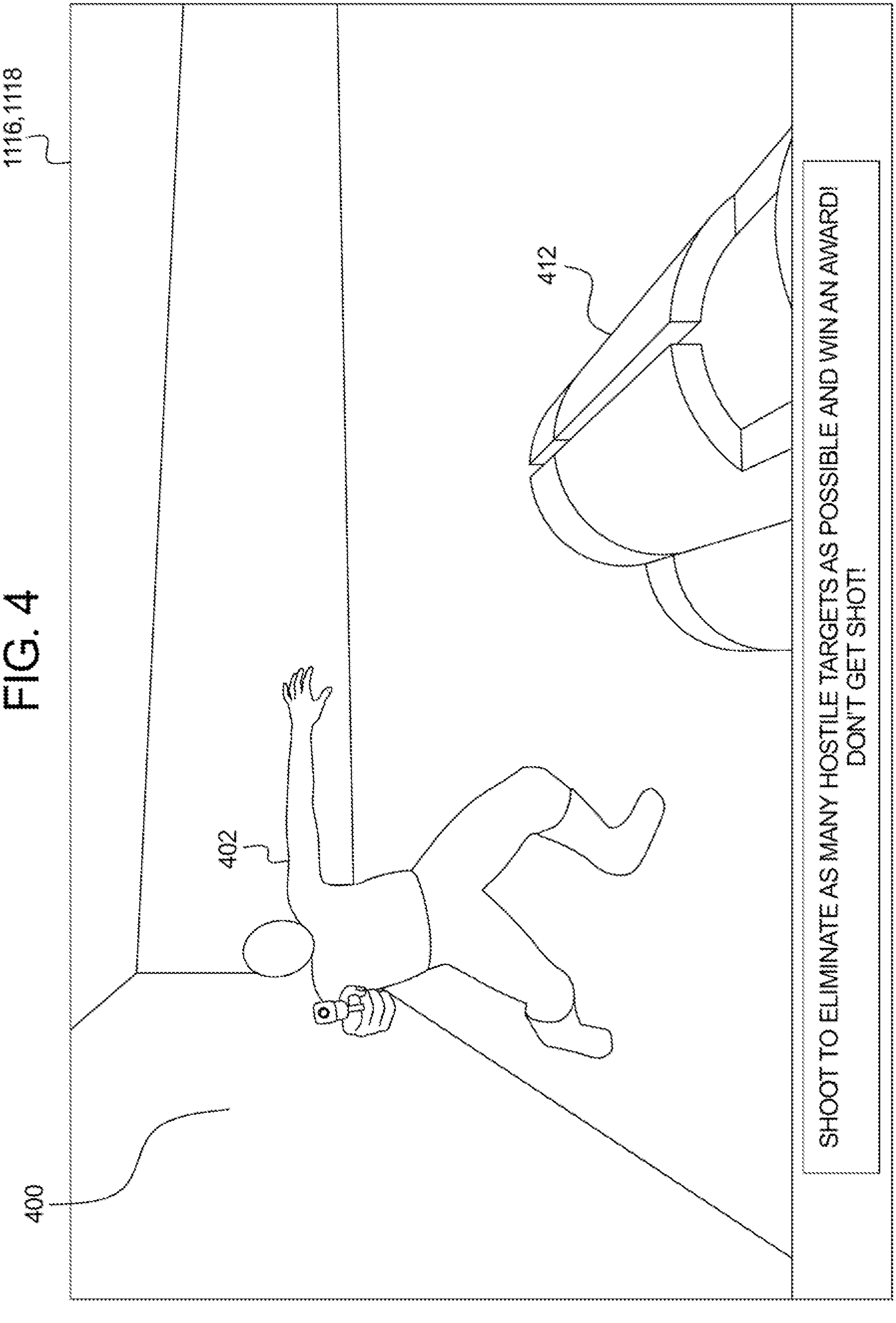
FIG. 4 is an illustrated example of one embodiment of a community or group skill-based game as disclosed herein.

An example of a community skill-based game is illustrated in FIG. 4. This illustrated example of a community skill-based game is represented by a community shooter game. In this community shooter game, each of a plurality of players is represented by an avatar 402 including a virtual shooting device 412 in a virtual world 400. The gaming system of FIG. 4 enables the plurality of players to each make one or more skill-based inputs (which are each quantifiable and tend to measure a level of skill of each of the players), wherein the one or more skill-based inputs influence one or more outcomes (or events) to occur. For example, the gaming system enables a first player of the community shooter game illustrated in FIG. 4 to make one or more inputs, wherein the one or more skill-based inputs result in either one of: (i) the avatar that is representative of the first player, shooting at, or eliminating a second, different avatar that is representative of a second, different player participating in the community shooter game (i.e., a first determined skill-based game outcome for the first player), or (ii) the avatar that is representative of the first player being shot, shot at, or eliminated by a second, different avatar that is representative of a second, different player participating in the community shooter game (i.e., a second determined skill-based game outcome for the first player).

In various embodiments, if an interruption event occurs at one of, at a plurality of, or at each of a plurality of gaming devices associated with a play of a community skill-based game, the gaming system disclosed herein provides each of the players a resumption opportunity prior to resuming the play of the interrupted community skill-based game. That is, because one player's input may influence another player's outcome, the gaming system provides a resumption opportunity such that the outcome of the interrupted community skill-based game is determined based, at least in part, on elements of each player's skill (and not determined based on each player's preparedness or unpreparedness to resume such interrupted community skill-based game or partial skill-based game). As such, by enabling players of a community or skill-based game to indicate a readiness to resume play of an interrupted community skill-based game, the gaming system minimizes (or substantially eliminates) the effects of an interruption on such a game.

It should be appreciated that if the gaming system were to automatically resume play of an interrupted community skill-based game (without first providing players of the interrupted community skill-based game a resumption opportunity as discussed herein) and certain players are ready to resume play of an interrupted community skill-based game while certain other players are not ready to resume play of the interrupted community skill-based game, then those players that are ready to resume play of the interrupted community skill-based game have an unfair advantage over those players that are not ready. For example, in a community shooter game, if the gaming system automatically resumes play of a skill-based game after an occurrence of an interruption event and certain players are ready and certain other players are not ready, then those players that are ready to resume play have an unfair advantage over those players that are not ready. In this example, once the gaming system resumes play of the interrupted community skill-based game, those players that are ready to resume will easily eliminate any players that are not ready. Accordingly, by providing the player resumption opportunity discussed herein, these unfair advantages are minimized (or substantially eliminated).

Figure 5A:
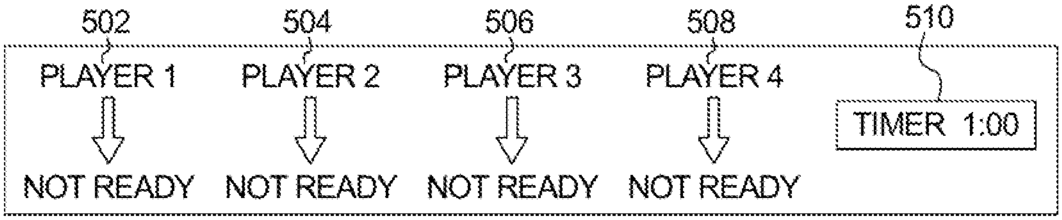
FIGS. 5A, 5B and 5C are diagrams indicating different player's readiness for one embodiment of an interrupted community or group skill-based game as disclosed herein.

For example, as seen in FIG. 5A, the gaming system prompts four players (Player 1, Player 2, Player 3 and Player 4 as indicated by identifiers 502, 504, 506 and 508, respectively) to indicate a readiness to resume play of an interrupted community skill-based game and provides each of the four players one minute (as indicated by timer 510) to indicate their readiness to resume play of the interrupted community skill-based game.

Figure 5B:
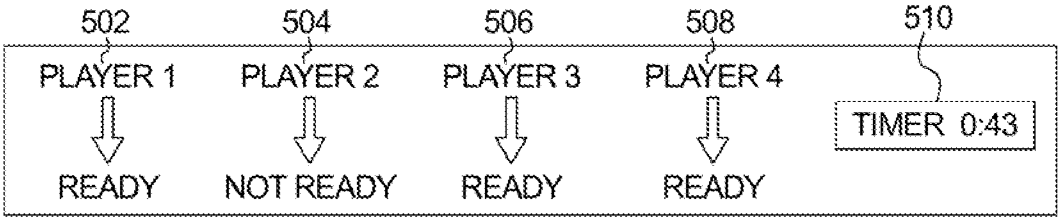

Referring now to the illustrated example of FIG. 5B, after seventeen seconds elapse (i.e., timer 510 has decreased from one minute to forty-three seconds), Player 1, Player 3 and Player 4 have each indicated a readiness to resume play of the interrupted community skill-based game and Player 2 has not indicated a readiness to resume play of the interrupted community skill-based game. In this illustrated example, because one or more of the four prompted players (i.e., Player 2) has not affirmatively (either actively or passively) indicated a readiness to resume play of the interrupted community skill-based game, and because timer 510 has not reached zero, the gaming system does not resume play of the interrupted community skill-based game. That is, in the illustrated example of FIG. 5B, while Player 1, Player 3 and Player 4 are each ready to resume play of the interrupted community skill-based game, the gaming system does not resume play of the interrupted community skill based game. As such, the gaming system of this example does not provide Player 1, Player 3 or Player 4 an advantage over Player 2 following the interruption event.

Figure 5C:
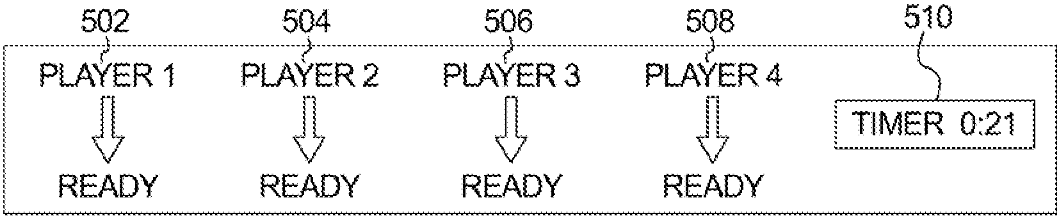

Referring now to the illustrated example of FIG. 5C, after thirty-nine seconds (i.e., timer 510 decreases from one minute to twenty-one seconds), each of the four prompted players has indicated a readiness to resume play of the interrupted community skill-based game. Accordingly, because each of the four prompted players of FIG. 5C are ready to resume play of the interrupted community skill-based game, the gaming system resumes play of the interrupted community skill-based game. That is, while the timer has not reached zero, because each of the four prompted players is ready to resume play of the interrupted community skill-based game, the gaming system resumes play of the interrupted community skill-based game.

Figure 6:
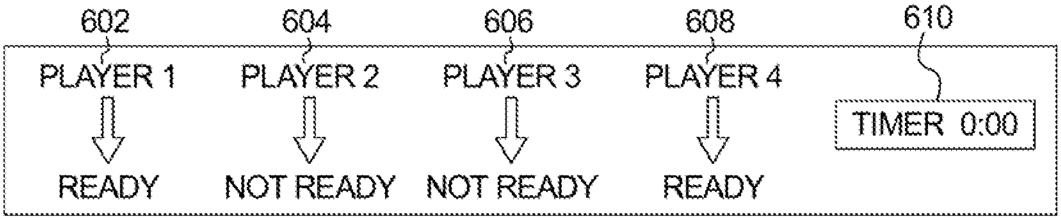
FIG. 6 is a diagram indicating different player's readiness for one embodiment of an interrupted community or group skill-based game as disclosed herein

As indicated above, in certain embodiments, the gaming system resumes play of the interrupted community skill-based game when the first occurs between: (i) a clock or meter reaches a designated amount, or (ii) each of the players of an interrupted community skill-based game affirmatively indicates a readiness to resume play of the interrupted community skill-based game. In these embodiments, the gaming system resumes play of the interrupted community skill based game when the clock or meter reaches the designated amount (regardless of whether each of the players included in the interrupted community skill-based game are ready to resume play of the interrupted community skill-based game). For example, as illustrated in FIG. 6, the gaming system prompts each of four players (Player 1, Player 2, Player 3 and Player 4) to indicate a readiness to resume an interrupted community skill-based game. In this illustrated example, the gaming system resumes the interrupted community skill-based game because the timer (i.e., the clock/meter) has reached zero (i.e., the designated amount). That is, while certain of the prompted players (i.e., Player 2 and Player 3) have not affirmatively indicated a readiness to resume the interrupted community skill-based game, following giving such players the opportunity to indicated a readiness to resume, the gaming system resumes play of the interrupted community skill-based game.

Figure 7:
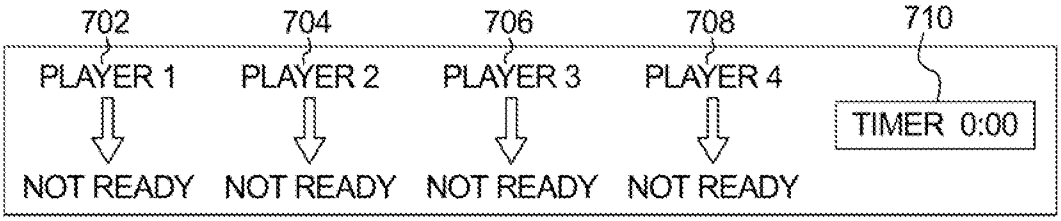
FIG. 7 is a diagram indicating different player's readiness for one embodiment of an interrupted community or group skill-based game as disclosed herein.

It should be appreciated that, in certain embodiments, if no player included in an interrupted community skill-based game indicates a readiness to resume play of the interrupted community skill-based game, then the gaming system does not resume play of the interrupted community skill-based game. In other words, in certain embodiments, an interrupted community skill-based game does not resume regardless of whether a meter or clock reaches a designated amount. For example, referring to FIG. 7, while timer 710 reaches zero (i.e., a designated amount), the gaming system does not resume play of the interrupted community skill-based game. That is, in this illustrated example of FIG. 7, the gaming system does not resume play of the interrupted community skill-based game because none of the four players have indicated a readiness (either actively or passively) to resume play of the interrupted community skill-based game.

As discussed above, in various embodiments, the gaming system stores game state data pertaining to the play of the triggered skill-based game continuously, substantially continuously or periodically. In certain embodiments, the gaming system stores game state data based on the progress (or sequence of events which have occurred in association with) of the skill-based game. That is, each time a designated point is encountered (such as a check point) or a specific task is completed (such as the collection of a collection unit), the gaming system stores the game state data.

Figure 8:
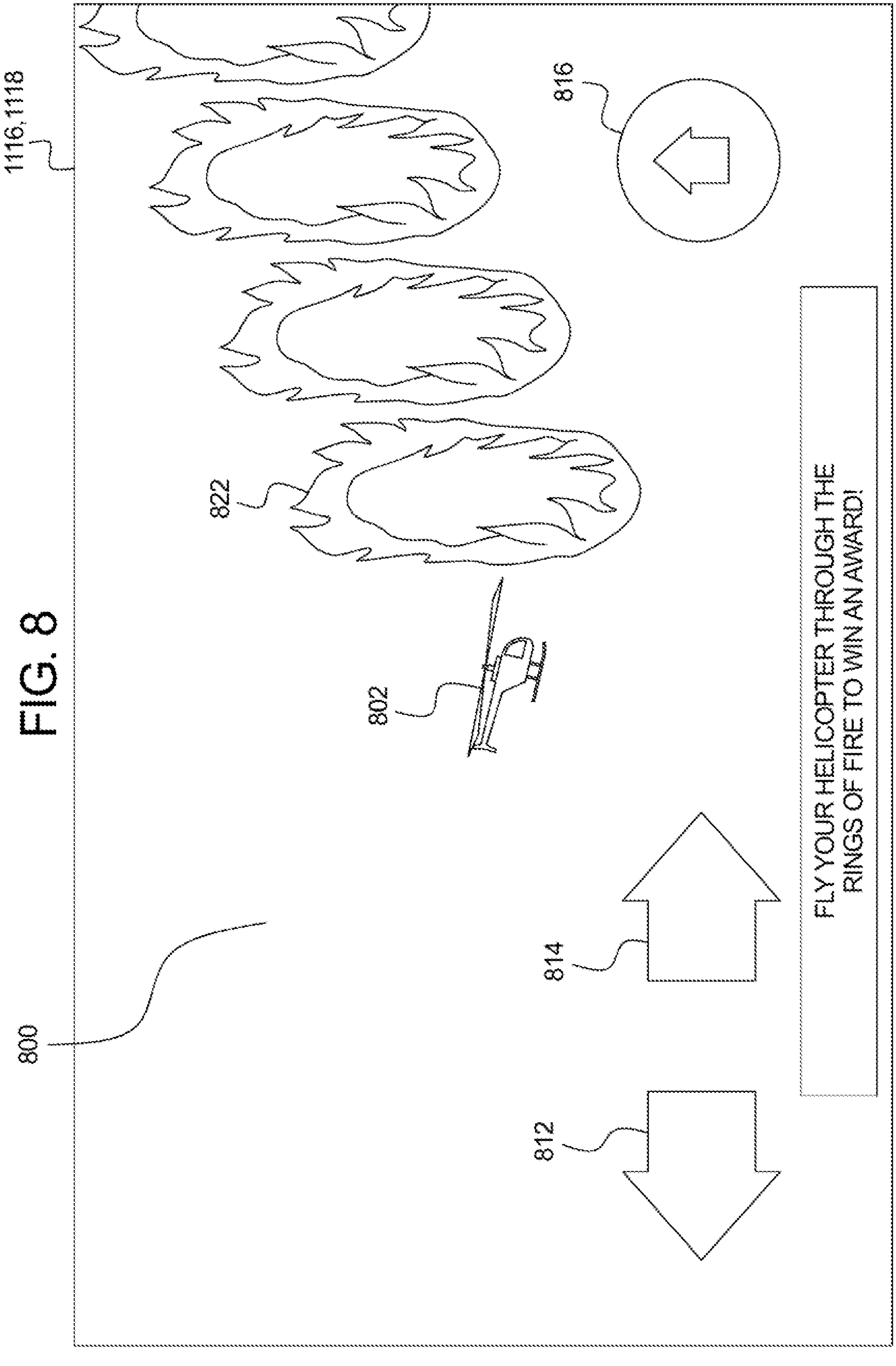
FIG. 8 is an illustrated example of one embodiment of a skill-based game as disclosed herein.

For example, FIG. 8 illustrates a skill-based game including a virtual world 800 and a helicopter 802, wherein a player utilizes one or more input devices (such as arrows 812, 814 and 816) to make one or more skill-based inputs to navigate the helicopter 802 through a series of rings of fire 822. In the illustrated example of FIG. 8, the gaming system stores game state data each time the player successfully navigates the helicopter 802 through a ring of fire 822. In this illustrated example, each ring of fire 822 is representative of a checkpoint such that, in the event of a power failure (or other game interruption), the gaming system resumes play from the last encountered ring of fire 822 (i.e., checkpoint). While the illustrated example of FIG. 8 pertains to a single player, it should be appreciated that the gaming system includes checkpoints in multi-player environments such that each time a checkpoint (i.e., a designated point, location, interval, setting, etc) is encountered, the gaming system stores the game state data.

As discussed above, in various embodiments, the gaming system enables a player of an individual skill-based game (or one or more players of a community skill-based game) to indicate a readiness to resume the skill-based game after an interruption event occurs. In certain embodiments, players actively indicate a readiness to resume play of an interrupted skill-based game. In various other embodiments, players passively indicate a readiness to resume play of an interrupted skill-based game. In one such embodiment, the gaming system detects a player's presence at a gaming device through one or more sensing devices. According to specific embodiments, the gaming device or gaming system detects the presence of a player by virtue of one or more of a variety of different types of technologies such as: cameras, pressure sensors (e.g., embedded in a seat, bumper, table top, etc.), motion detectors, image sensors, signal detectors (e.g., RFID signal detectors), dealer and/or player input devices, etc. In various embodiments, the readiness of one or more players of an interrupted skill-based game is based on the detection of those one or more players. For example, one or more cameras associated with a gaming machine detect: (1) a player's presence at the gaming machine (e.g., the player is standing in front of the gaming machine), or (2) a player's engagement (e.g., the player is looking at a screen of the gaming machine, or the player is touching a feature/element of the gaming machine). It should be appreciated that the gaming machine detects player presence via certain gaming machine features/elements. For example, the gaming machine detects tactile feedback to determine player presence (e.g., vibrations of a gaming machine feature/element such as a button or joystick).

In one alternative embodiment, in response to a player of an individual skill-based game (or in response to a plurality of players of a community skill-based game) indicating a readiness to resume play of an interrupted skill-based game, the gaming system displays an indication to the player (or players) that the game is about to resume. In one such embodiment, in response to a player indicating a readiness to resume play of an interrupted skill-based game, the gaming system designates an amount of time, after which, the gaming system resumes play of the interrupted skill-based game. For example, after a player indicates a readiness to resume play of an interrupted skill-based game, the gaming system displays or otherwise indicates to the player that play will resume three seconds. In this example, the gaming system provides appropriate messages such as "GET READY, THE GAME WILL RESUME ON THE COUNT OF THREE!" and "THREE, TWO, ONE, GO!" to the player visually, or through suitable audio or audiovisual displays. It should be appreciated that by indicating to the player (or players) that the game is about to resume, the gaming system facilitates that the player (or players) are not surprised when the play resumes. Accordingly, the gaming system minimizes (or substantially eliminates) the effects of any interruptions to the play of skill-based games.

In addition to storing game state data in anticipation of an interruption event, such as a power failure, in another alternative embodiment, the gaming system stores game state data in anticipation of one or more players making an input to pause a play of a skill-based game. In one such embodiment, the gaming system enables a player of an individual skill-based game (or one or more players of a community skill-based game) to make an input to pause (or otherwise suspend) play of the skill-based game. After pausing a play of a game, and in response to a determination to resume play of the paused skill-based game (as a result of an input by one or more players to pause the skill-based game) the gaming system loads game state data stored prior to the input by the one or more players to pause the skill-based game.

In various other embodiments, the gaming system determines a plurality of skill-based game outcomes wherein, in addition to determining one or more outcomes based, at least in part, on one or more quantifiable skill inputs made by the player, the gaming system determines one or more outcomes independent of any skill-based inputs made by the player. In these embodiments, the gaming system provides awards based on the plurality of determined outcomes. That is, in certain embodiments, the gaming system provides both of: (i) one or more awards based on one or more quantifiable skill inputs made by a player of a skill-based game, and (ii) one or more awards based on one or more outcomes determined independent of any quantifiable skill inputs made by the player of the skill-based game.

While the above illustrated example includes storing game state data each time a designated object is encountered, in various alternative embodiments, the gaming system designates a quantity of zero, one or more designated objects and when a quantity of designated objects encountered in association with the play of the game is equivalent to (or within a designated range of) the designated quantity, the gaming system stores the game state data. For example, the gaming system stores the game state data each time a player successfully navigates the turtle avatar of FIG. 2 to collect five collection units. In another example, the gaming system stores the game state data each time a player successfully navigates the helicopter of FIG. 8 through three rings of fire. It should be appreciated that, in certain embodiments, the gaming system stored the game state data based on a combination of events (e.g., collection units and checkpoints). It should be appreciated that the gaming system may be configured to store game state data based on any suitable criteria.

In one alternative embodiment, the designated quantity of objects encountered before the gaming system stores the game state data can vary. For example, in a first play of a game, the designated quantity of objects encountered before the gaming system stores the game state data is a first designated quantity. In a second play of the game, the designated quantity of objects encountered before the gaming system stores the game state data is a second, different designated quantity. It should be appreciated that the designated quantity can vary from one play of a skill-based game to another play of the skill-based game or the designated quantity can vary within a single play of a skill-based game.

In various embodiments, the gaming system loads the stored game state data and resumes play based on the loaded game state data. In one embodiment, the loaded game state data corresponds to a beginning point of a game. In another embodiment, the loaded game state data corresponds to an end point of a game. In yet another embodiment, the loaded game state data corresponds to a point after a beginning point of a game and prior to an ending point of the game.

In one embodiment, if an interruption event occurs, the gaming system restores/recreates a game-play environment based on the loaded game state data and resumes play based on the loaded game state data. In one embodiment, play resumes from any point-in-time, and/or location, and/or setting, and/or level, and/or interval prior to the interruption event. For example, the gaming system resumes play from a last encountered checkpoint, a last encountered object or collection unit, and/or a last acquired object or collection unit. It should be appreciated that, in certain embodiments, the gaming system resumes play from any point-in-time, and/or location, and/or setting, and/or level, and/or interval prior to a last encountered checkpoint, a last encountered object or collection unit, and/or a last acquired object or collection unit.

In one embodiment, the gaming system enables acquisition of collection units (and/or objects) acquired and/or encountered prior to the interruption event. In another embodiment, the gaming system prevents or otherwise prohibits any acquisition of any collection units (and/or objects) that were acquired and/or encountered prior to the interruption event. For example, in the skill-based game illustrated in FIG. 2, the gaming system prevents or otherwise prohibits the acquisition of any collection units 212 that were encountered and/or acquired prior to the interruption event. That is, in addition to preventing any acquisition of any collection units that were acquired prior to the interruption event, the gaming system additionally prevents any acquisition of any collection units that were encountered but were not successfully acquired prior to the interruption event.

In one such embodiment, the gaming system prevents such acquisitions by removing from the game-play environment (i.e., not including, not displaying, not recreating, not illustrating and/or not representing) any encountered objects (or collection units) that were encountered or acquired prior to an interruption event such that the previously encountered objects (or collection units) are not included, displayed, recreated, illustrated and/or represented after play is resumed. In another such embodiment, the gaming system recreates the game-play environment and includes, displays, recreates, illustrates and/or represents any previously encountered objects or collection units. In this embodiment, the gaming system ghosts such objects or collection units (i.e., visually indicates such objects or collection units but prevents acquisition of such objects or collection units). It should be appreciated that, in this embodiment, while objects or collection units previously encountered or acquired are included, displayed, recreated, illustrated and/or represented in the recreated game-play environment, the gaming system still prevents any acquisition of such objects or collection units. It should also be appreciated that by ghosting such objects or collection units, the gaming system indicates which objects or collection units were previously encountered or acquired. Additionally, regarding the path game example illustrated in FIG. 2, any ghosted collection units encountered and/or acquired prior to the interruption event are representative of the path prior to the interruption event.

In one alternative embodiment, the stored and loaded game state data corresponds to both: (i) a last encountered object, and (ii) a last encountered designated point. For example, the loaded game state data corresponds to a last encountered checkpoint and a last encountered collection unit. In this example, the gaming system resumes play of the skill-based game after the last encountered checkpoint and removes, in addition to the last encountered collection unit, all collection units prior to the last encountered collection unit. In various embodiments, the gaming system stores game state data in persistent storage such a NVRAM, a hard drive, a solid state drive, or any other suitable persistent storage. In various embodiments, the gaming system stores game state data locally. In various other embodiments, the gaming system store game state data remotely.

In one embodiment, the gaming system causes at least one display device of the player's gaming device to display the skill-based game. In another embodiment, in addition or in alternative to each gaming device displaying the skill-based game, the gaming system causes one or more community or overhead display devices to display part or all of the multiple skill-based game to one or more other players or bystanders either at a gaming establishment or viewing over a network, such as the internet. In another embodiment, in addition or in alternative to each gaming device displaying the skill-based game, the gaming system causes one or more internet sites to each display the skill-based game such that a player is enabled to log on from a personal web browser. In another such embodiment, the gaming system enables the player to play one or more primary games on one device while viewing the skill-based game from another device. For example, the gaming system enables the player to play one or more primary games on a mobile phone while viewing the status of the skill-based game on a desktop or laptop computer.

In one embodiment, as mentioned above, a skill-based game triggering event occurs based on an outcome associated with one or more plays of any primary game and/or an outcome associated with one or more plays of any secondary game of the EGMs in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a skill-based game triggering event to occur.

In another embodiment, as also mentioned above, the gaming system does not provide any apparent reasons to the players for a skill-based game triggering event to occur. In these embodiments, such determinations are not triggered by an event in a primary game or based specifically on any of the plays of any primary game or on any of the plays of any secondary game of the EGMs in the gaming system. That is, these events occur without any explanation or alternatively with simple explanations.

In one embodiment, a skill-based game triggering event occurs based on an amount of coin-in. In this embodiment, the gaming system determines if an amount of coin-in wagered at one or more EGMs in the gaming system reaches or exceeds a designated amount of coin-in (i.e., a threshold coin-in amount). Upon the amount of coin-in wagered at one or more EGMs in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the EGM, determined based on one or more side wagers placed, determined based on the player's primary game wager, determined based on time (such as the time of day) or determined based on any other suitable method or criteria.

In another alternative embodiment, a skill-based game triggering event occurs based on an amount of coin-out. In this embodiment, the gaming system determines if an amount of coin-out provided by one or more EGMs in the gaming system reaches or exceeds a designated amount of coin-out (i.e., a threshold coin-out amount). Upon the amount of coin-out provided at one or more EGMs in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the EGM, determined based on one or more side wagers placed, determined based on the player's primary game wager, determined based on time (such as the time of day) or determined based on any other suitable method or criteria.

In another alternative embodiment, a skill-based game triggering event occurs based on a predefined variable reaching a defined parameter threshold. For example, when the 500,000th player has played an EGM of the gaming system (ascertained from a player tracking system), one or more of such events or conditions occur. In different embodiments, the predefined parameter thresholds include a length of time, a length of time after a certain dollar amount is hit, a wager level threshold for a specific device (which EGM is the first to contribute $250,000), a number of EGMs active, or any other parameter that defines a suitable threshold.

In another alternative embodiment, a skill-based game triggering event occurs based on a quantity of games played. In this embodiment, a quantity of games played is set for when one or more of such events or conditions will occur. In one embodiment, such a set quantity of games played is based on historic data.

In another alternative embodiment, a skill-based game triggering event occurs based on time. In this embodiment, a time is set for when one or more of such events or conditions will occur. In one embodiment, such a set time is based on historic data.

In another alternative embodiment, a skill-based game triggering event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the EGM. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a skill-based game triggering event occurs based on a system determination, including one or more random selections by the central controller. In one embodiment, as described above, the central controller tracks all active EGMs and the wagers they placed. In one such embodiment, based on the EGM's state as well as one or more wager pools associated with the EGM, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a skill-based game triggering event occurs based on a determination of if any numbers allotted to an EGM match a randomly selected number. In this embodiment, upon or prior to each play of each EGM, an EGM selects a random number from a range of numbers and during each primary game, the EGM allocates the first N numbers in the range, where N is the number of credits (or a designated percentage of the number of credits) bet by the player in that primary game. At the end of the primary game, the randomly selected number is compared with the numbers allocated to the player and if a match occurs, one or more of such events or conditions occur. It should be appreciated that any suitable manner of causing a skill-based game triggering event to occur may be implemented in accordance with the gaming system and method disclosed herein.

It should be appreciated that any of the above-described skill-based game triggering events may be combined in one or more different embodiments.

It should be appreciated that in different embodiments, one or more of:

i. when a skill-based game triggering event occurs;
ii. when a skill-based game is initiated;
iii. what type of skill-based game to initiate;
iv. whether to initiate a skill-based game or a partial-skill-based game;
v. which type of skill to associate with the skill-based game;
vi. which type of player skill inputs to enable one or more players to make;
vii. a quantity of player skill inputs to enable one or more players to make;
viii. a quantity of players participating in a skill-based game;
ix. one or more amounts of time allotted for a play of a skill-based game;
x. one or more points in time at which the gaming system stores game state data;
xi. one or more intervals at which gaming system stores game state data;
xii. the quantity of one or more game objects (i.e., checkpoints, collection units, etc) included in a skill-based game;
xiii. the locations of one or more game objects (i.e., checkpoints, collection units, etc) included in a skill-based game;
xiv. one or more awards based on one or more outcomes determined independent of any quantifiable skill inputs made by the player of the skill-based game;
xv. one or more awards provided in association with a play of a skill-based game;
xvi. an amount of time provided to players to indicate a readiness to resume play of an interrupted skill-based game;
xvii. an amount of time after players indicate a readiness to resume play of an interrupted skill-based game and the resumption of that interrupted skill-based game;
xviii. an amount of time after the gaming system loads previously stored game state data for an interrupted skill-based game and before the gaming system resumes play of the interrupted skill-based game;
xix. when to resume an interrupted skill-based game;
xx. the skill-based game outcome determination event;
xxi. any event or trigger association with a skill-based game; and
xxii. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 9A:
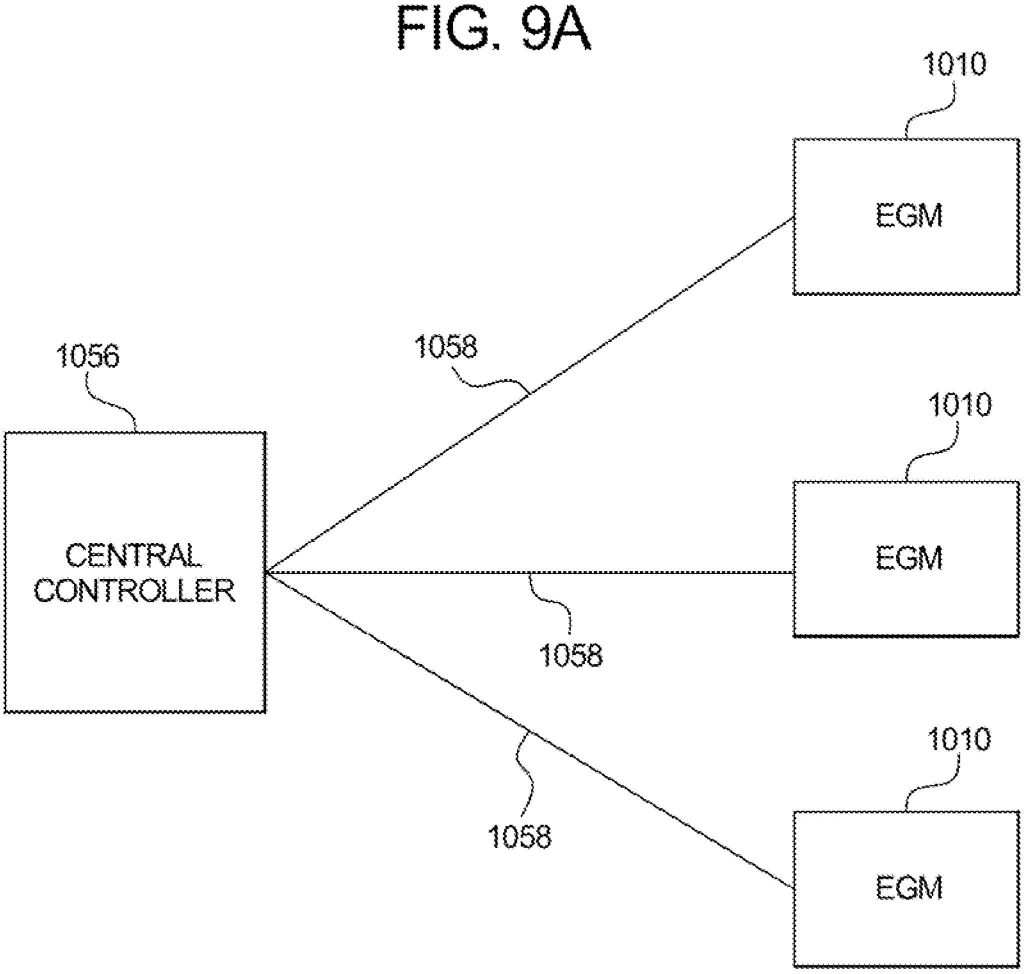
FIG. 9A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 9A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 9B:
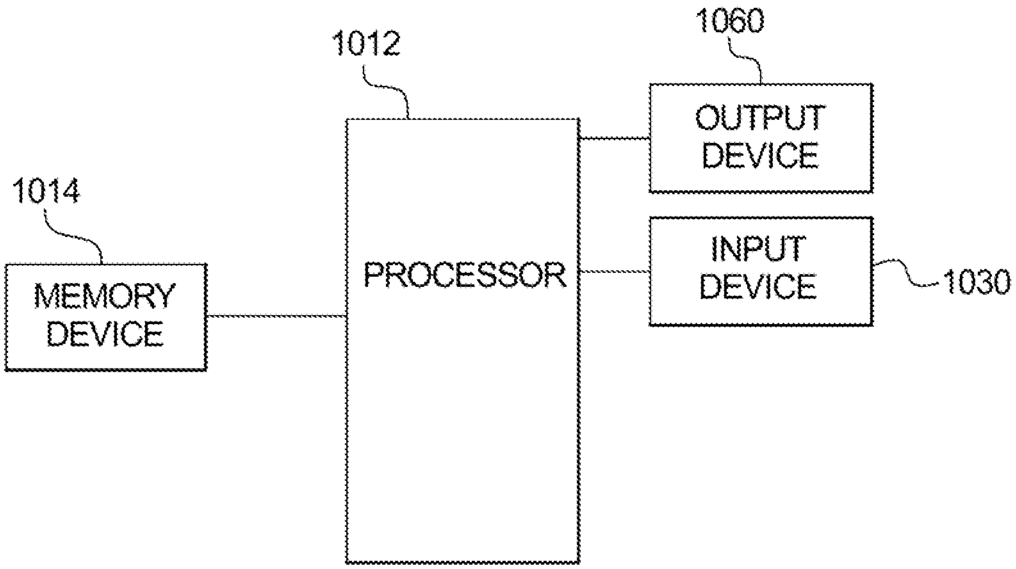
FIG. 9B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 9B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 9B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 10A:
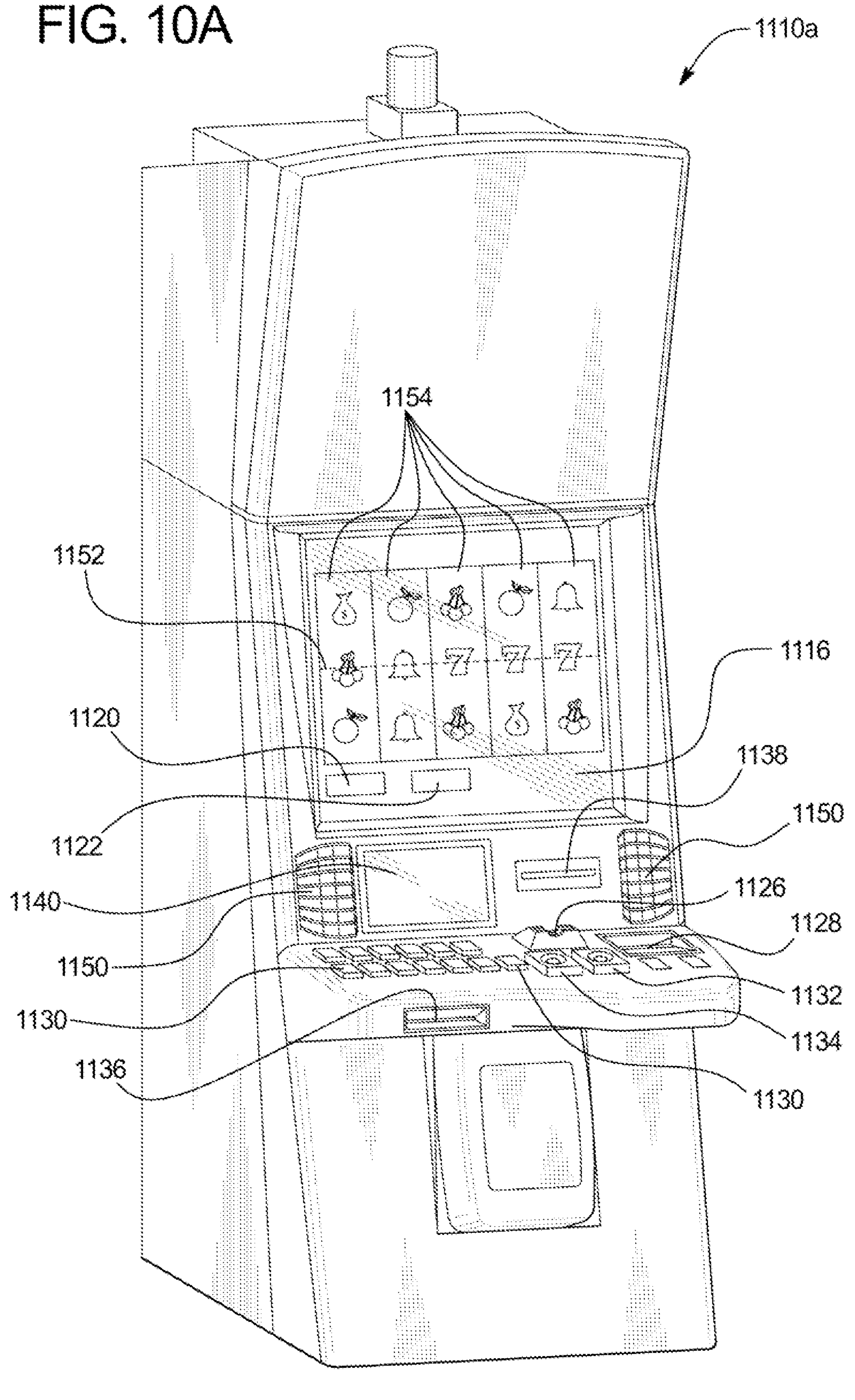
FIGS. 10A and 10B are perspective views of example alternative embodiments of the gaming system disclosed herein.
Figure 10B:
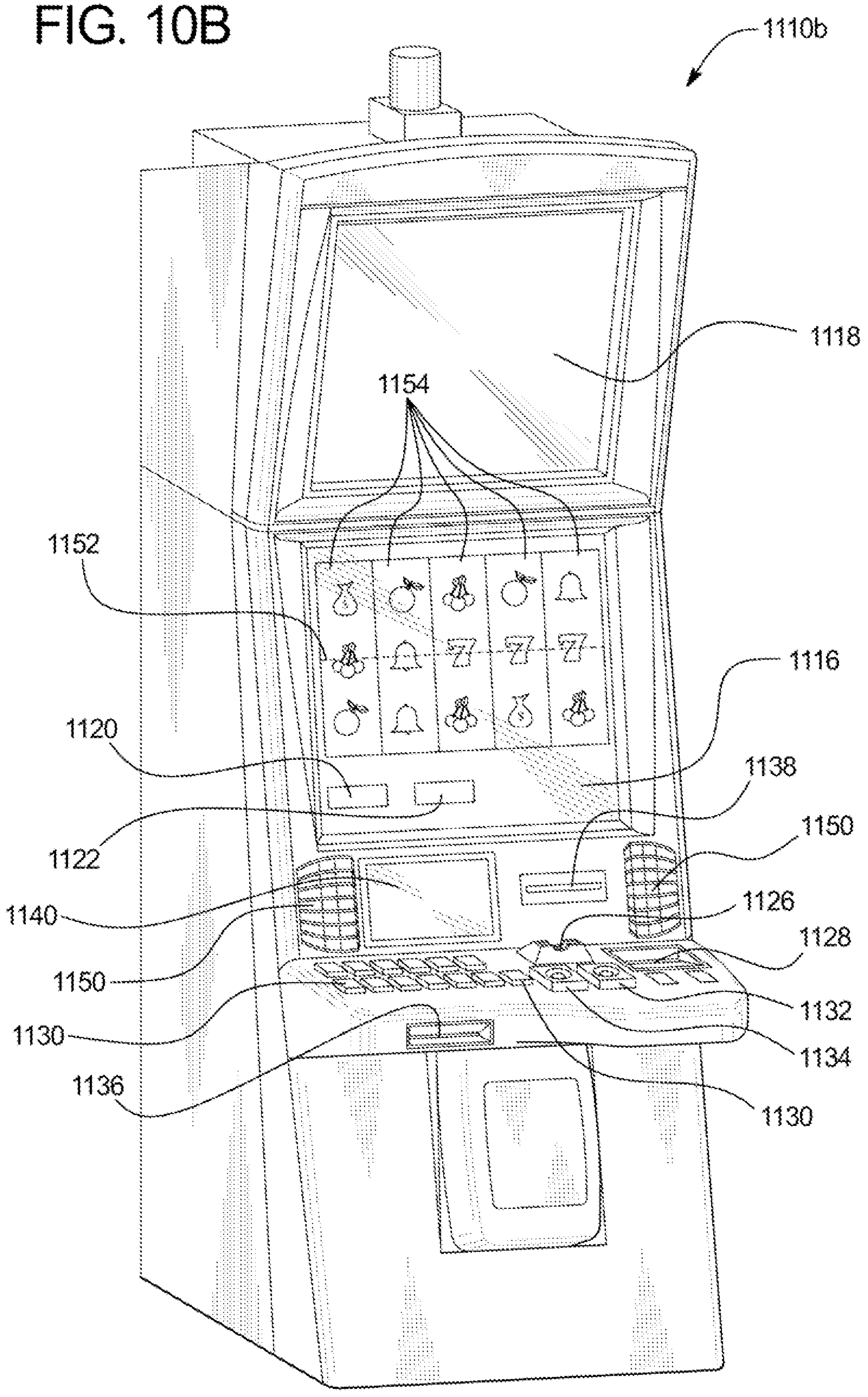

In various embodiments, the EGM includes one or more input devices. The input devices may include any suitable device that enables an input signal to be produced and received by the at least one processor of the EGM. The example EGM illustrated in FIG. 9B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 10A and 10B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 10A and 10B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 10A and 10B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 10A and 10B each include a card reader 1138. The card reader is configured to read a player identification card inserted into the card reader.

In various embodiments, the EGM includes one or more output devices. The example EGM illustrated in FIG. 9B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 10A includes a central display device 1116, a player tracking display 1140, a credit display 1120, and a bet display 1122. The example EGM illustrated in FIG. 10B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 10A and 10B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 10A and 10B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 10A and 10B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 10A and 10B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electromechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 10A and 10B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of operating a gaming system, the method comprising:

following a triggering of a play of a community game upon an occurrence of a triggering event associated with a play of a wagering game, displaying, by a display device, the play of the community game, independent of any placement of any wager on the play of the wagering game, and upon each occurrence of a game state storage event, causing, by a processor, game state data associated with the play of the community game to be stored, and responsive to a game interruption event occurring prior to a determination of any outcome of the play of the community game:

for a period of time, enabling receipt of an indication to resume the play of the community game, responsive to a receipt of the indication to resume the play of the community game within the period of time, communicating a designation of ready to resume the play of the community game prior to an expiration of the period of time, and responsive to no receipt of the indication to resume the play of the community game within the period of time, after the expiration of the period of time, resuming, by the processor, the play of the community game, wherein the play of the community game is resumed based on the stored game state data.

2. The method of claim 1, further comprising displaying, by the display device, a countdown of the period of time.

3. The method of claim 1, wherein the game interruption event comprises any of a power failure, a tilt, a malfunction, an error, and a pause.

4. The method of claim 1, wherein the community game comprises any of a community skill-based game and a community partial skill-based game.

5. The method of claim 4, wherein the community game comprises a quantity of quantifiable inputs made by an input device, each of the quantifiable inputs being any of a quantifiable input of a mental skill, and a quantifiable input of a physical skill.

6. The method of claim 1, further comprising modifying, by the processor, the game state data prior to any loading of the stored game state data by any of a removal of a game element that was acquired prior to the game interruption event, a modification of the community game to prevent a display of a game element which was encountered but not acquired prior to the game interruption event, and a modification of the community game to alter a display of a game element acquired prior to the game interruption event.

7. The method of claim 1, further comprising loading, by the processor, the stored game state data prior to the period of time.

8. The method of claim 1, wherein the game state storage event occurs in association with a modification of the game state data.

9. The method of claim 1, wherein the receipt of the indication to resume the play of the community game is received via an input device.

10. A method of operating a gaming system, the method comprising:

following a triggering of a play of a game of skill upon an occurrence of a triggering event associated with a play of a wagering game, enabling a receipt, via an input device, of a quantifiable input for the play of the game of skill, independent of any placement of any wager on the play of the wagering game and with each quantifiable input made, causing, by a processor, game state data associated with the play of the game of skill to be stored, and responsive to a game interruption event occurring prior to a determination of any outcome of the play of the game of skill:

for a period of time, enabling receipt of an indication to resume the play of the game of skill, responsive to a receipt of the indication to resume the play of the game of skill within the period of time, communicating a designation of ready to resume the play of the game of skill prior to an expiration of the period of time, and responsive to no receipt of the indication to resume the play of the game of skill within the period of time, after the expiration of the period of time, resuming, by the processor, the play of the game of skill, wherein the play of the game of skill is resumed based on the stored game state data.

11. The method of claim 10, further comprising modifying, by the processor, the game state data prior to any loading of the stored game state data by any of a removal of a game element that was acquired prior to the game interruption event, a modification of the game of skill to prevent a display of a game element which was encountered but not acquired prior to the game interruption event, and a modification of the game of skill to alter a display of a game element acquired prior to the game interruption event.

* * * * *